United States Patent
Suzuki

(10) Patent No.: US 8,939,592 B2
(45) Date of Patent: Jan. 27, 2015

(54) POLARIZER AND LIGHT-EMITTING DEVICE

(75) Inventor: Naofumi Suzuki, Tokyo (JP)

(73) Assignee: NEC Corporation, Tokyo (JP)

( * ) Notice: Subject to any disclaimer, the term of this patent is extended or adjusted under 35 U.S.C. 154(b) by 10 days.

(21) Appl. No.: 13/808,462

(22) PCT Filed: Jul. 6, 2011

(86) PCT No.: PCT/JP2011/065472
§ 371 (c)(1),
(2), (4) Date: Jan. 4, 2013

(87) PCT Pub. No.: WO2012/017774
PCT Pub. Date: Feb. 9, 2012

(65) Prior Publication Data
US 2013/0100636 A1    Apr. 25, 2013

(30) Foreign Application Priority Data
Aug. 2, 2010   (JP) ................... 2010-173475

(51) Int. Cl.
F21V 9/14   (2006.01)
G02B 5/30   (2006.01)

(52) U.S. Cl.
CPC ............... F21V 9/14 (2013.01); G02B 5/3058 (2013.01)
USPC ... 362/19; 362/97.1; 359/485.03; 359/485.05

(58) Field of Classification Search
USPC ............................ 362/19, 97.1; 359/483, 486
See application file for complete search history.

(56) References Cited

U.S. PATENT DOCUMENTS

| | | | | |
|---|---|---|---|---|
| 3,291,871 A | * | 12/1966 | Francis | 264/1.31 |
| 6,122,103 A | * | 9/2000 | Perkins et al. | 359/485.03 |
| 7,894,019 B2 | * | 2/2011 | Yamaki et al. | 349/96 |
| 2005/0068622 A1 | | 3/2005 | Hatano | |
| 2006/0185983 A1 | | 8/2006 | Kumai et al. | |
| 2007/0028457 A1 | * | 2/2007 | Yeh | 30/226 |
| 2008/0054283 A1 | | 3/2008 | Min et al. | |

FOREIGN PATENT DOCUMENTS

| | | |
|---|---|---|
| CN | 1825146 A | 8/2006 |
| JP | S61193122 A | 8/1986 |
| JP | H09090129 A | 4/1997 |
| JP | H10319390 A | 12/1998 |
| JP | 2001074935 A | 3/2001 |
| JP | 2004061614 A | 2/2004 |
| JP | 2005079104 A | 3/2005 |
| JP | 2005107317 A | 4/2005 |
| JP | 2006227515 A | 8/2006 |

(Continued)

OTHER PUBLICATIONS

The international search report for PCT/JP2011/065472 mailed on Aug. 9, 2011.
30-nm-wide aluminum nanowire grid for ultrahigh contrast and transmittance polarizers made by UV-nanoimprint litography.

(Continued)

Primary Examiner — Ali Alavi
(74) Attorney, Agent, or Firm — Sughrue Mion, PLLC

(57) ABSTRACT

Provided is a polarizer that includes wire grid structure (11) having a plurality of thin metal wires arranged to extend in one direction. Thin metal wire (13) is formed by stacking aluminum layer (5) and silver layer (6). Silver layer 6 is disposed on a side wherein incoming light enters wire grid structure (11).

12 Claims, 27 Drawing Sheets

(56) References Cited

FOREIGN PATENT DOCUMENTS

| JP | 2006343559 A | 12/2006 |
|----|--------------|---------|
| JP | 2007010713 A | 1/2007 |
| JP | 2007033746 A | 2/2007 |
| JP | 2008060534 A | 3/2008 |
| JP | 2009042770 A | 2/2009 |
| JP | 2009139411 A | 6/2009 |
| TW | 200510772    | 3/2005 |

OTHER PUBLICATIONS

Jian Jim Wang et al., "30-nm-wide aluminum nanowire grid for ultrahigh contrast and transmittance polarizers made by UV-nanoimprint litography", American Institute of Physics, Applied Physics Letters, American Physical Society's Open Access Journal, vol. 89, [Internet] <URL: http://dx.doi.org/10.1063/1.2358813>, [published online] Oct. 2, 2006, pp. 141105-1-3. (p. 2, [0009]).

Chinese Office Action for CN Application No. 201180038035.9 issued on Jul. 21, 2014 with English Translation.

\* cited by examiner

— ♦ — : TRANSMITTANCE OF TM LIGHT
--◇-- : REFLECTANCE OF TM LIGHT
— ● — : TRANSMITTANCE OF TE LIGHT
--○-- : REFLECTANCE OF TE LIGHT

─◆─ : TRANSMITTANCE OF TM LIGHT
--◇-- : REFLECTANCE OF TM LIGHT
─●─ : TRANSMITTANCE OF TE LIGHT
--○-- : REFLECTANCE OF TE LIGHT

─◆─ : TRANSMITTANCE OF TM LIGHT
--◇-- : REFLECTANCE OF TM LIGHT
─●─ : TRANSMITTANCE OF TE LIGHT
--○-- : REFLECTANCE OF TE LIGHT

─◆─ : TRANSMITTANCE OF TM LIGHT
--◇-- : REFLECTANCE OF TM LIGHT
─●─ : TRANSMITTANCE OF TE LIGHT
--○-- : REFLECTANCE OF TE LIGHT

─◆─ : TRANSMITTANCE OF TM LIGHT
--◇-- : REFLECTANCE OF TM LIGHT
─●─ : TRANSMITTANCE OF TE LIGHT
--○-- : REFLECTANCE OF TE LIGHT

— ◆ —: TRANSMITTANCE OF TM LIGHT
-- ◇ --: REFLECTANCE OF TM LIGHT
— ● —: TRANSMITTANCE OF TE LIGHT
-- ○ --: REFLECTANCE OF TE LIGHT

-- ○ --: ONLY ALUMINUM LAYER
         (COMPARATIVE EXAMPLE)
— ◆ —: ALUMINUM LAYER + SILVER LAYER
         (EMBODIMENT)
-- △ --: ONLY SILVER LAYER
         (COMPARATIVE EXAMPLE)

--○--: ONLY ALUMINUM LAYER
(COMPARATIVE EXAMPLE)
—◆—: ALUMINUM LAYER + SILVER LAYER
(EMBODIMENT)
--△--: ONLY SILVER LAYER
(COMPARATIVE EXAMPLE)

—◆—: INCIDENCE FROM SILVER LAYER SIDE
--◇--: INCIDENCE FROM ALUMINUM LAYER SIDE

— ♦ — : INCIDENCE FROM SILVER LAYER SIDE
-- ◇ -- : INCIDENCE FROM ALUMINUM LAYER SIDE

— ● — : INCIDENCE FROM SILVER LAYER SIDE
-- ○ -- : INCIDENCE FROM ALUMINUM LAYER SIDE

— ● — : INCIDENCE FROM SILVER LAYER SIDE
--○-- : INCIDENCE FROM ALUMINUM LAYER SIDE

── ♦ ──: TRANSMITTANCE OF TM LIGHT
--◇--: REFLECTANCE OF TM LIGHT
── ● ──: TRANSMITTANCE OF TE LIGHT
--○--: REFLECTANCE OF TE LIGHT

── ♦ ──: TRANSMITTANCE OF TM LIGHT
--◇--: REFLECTANCE OF TM LIGHT
── ● ──: TRANSMITTANCE OF TE LIGHT
--○--: REFLECTANCE OF TE LIGHT

— ◆ —: TRANSMITTANCE OF TM LIGHT
--◇--: REFLECTANCE OF TM LIGHT
— ● —: TRANSMITTANCE OF TE LIGHT
--○--: REFLECTANCE OF TE LIGHT

— ◆ —: TRANSMITTANCE OF TM LIGHT
--◇--: REFLECTANCE OF TM LIGHT
— ● —: TRANSMITTANCE OF TE LIGHT
--○--: REFLECTANCE OF TE LIGHT

——♦——: INCIDENCE FROM ALUMINUM LAYER SIDE
--◇--: INCIDENCE FROM SILVER LAYER SIDE

——♦——: INCIDENCE FROM ALUMINUM LAYER SIDE
--◇--: INCIDENCE FROM SILVER LAYER SIDE

— ◆ — : TRANSMITTANCE OF TM LIGHT
-- ◇ -- : REFLECTANCE OF TM LIGHT
— ● — : TRANSMITTANCE OF TE LIGHT
-- ○ -- : REFLECTANCE OF TE LIGHT

——◆——: TRANSMITTANCE OF TM LIGHT
--◇--: REFLECTANCE OF TM LIGHT
——●——: TRANSMITTANCE OF TE LIGHT
--○--: REFLECTANCE OF TE LIGHT

——◆——: TRANSMITTANCE OF TM LIGHT
--◇--: REFLECTANCE OF TM LIGHT
——●——: TRANSMITTANCE OF TE LIGHT
--○--: REFLECTANCE OF TE LIGHT

— ♦ — : TRANSMITTANCE OF TM LIGHT
— ◇ — : REFLECTANCE OF TM LIGHT
— ● — : TRANSMITTANCE OF TE LIGHT
— ○ — : REFLECTANCE OF TE LIGHT

— ○ — : ONLY ALUMINUM LAYER
(COMPARATIVE EXAMPLE)
— ♦ — : ALUMINUM LAYER + GOLD LAYER
(EMBODIMENT)
— △ — : ONLY GOLD LAYER
(COMPARATIVE EXAMPLE)

— ♦ —: TRANSMITTANCE OF TM LIGHT
--◇--: REFLECTANCE OF TM LIGHT
— ● —: TRANSMITTANCE OF TE LIGHT
--○--: REFLECTANCE OF TE LIGHT

— ♦ —: TRANSMITTANCE OF TM LIGHT
--◇--: REFLECTANCE OF TM LIGHT
— ● —: TRANSMITTANCE OF TE LIGHT
--○--: REFLECTANCE OF TE LIGHT

—◆—: TRANSMITTANCE OF TM LIGHT
--◇--: REFLECTANCE OF TM LIGHT
—●—: TRANSMITTANCE OF TE LIGHT
--○--: REFLECTANCE OF TE LIGHT

—◆—: TRANSMITTANCE OF TM LIGHT
--◇--: REFLECTANCE OF TM LIGHT
—●—: TRANSMITTANCE OF TE LIGHT
--○--: REFLECTANCE OF TE LIGHT

—◆— : TRANSMITTANCE OF TM LIGHT
---◇--- : REFLECTANCE OF TM LIGHT
—●— : TRANSMITTANCE OF TE LIGHT
---○--- : REFLECTANCE OF TE LIGHT

—◆— : TRANSMITTANCE OF TM LIGHT
---◇--- : REFLECTANCE OF TM LIGHT
—●— : TRANSMITTANCE OF TE LIGHT
---○--- : REFLECTANCE OF TE LIGHT

POLARIZER AND LIGHT-EMITTING DEVICE

TECHNICAL FIELD

The present invention relates to a polarizer and a light-emitting device using the same.

BACKGROUND ART

Recently, a display device such as a large display or a projector has greatly increased in performance. In such a display device, polarizing directions must be aligned in many cases. For example, in a liquid crystal display device widely used for a flat display, polarizers are arranged in both the incident side and the exit side of light from a light source and, by applying a voltage to a liquid crystal sandwiched between the polarizers, the polarized rotation of the incident light is controlled, and transmittance of the light to the exit side is controlled. The polarizer used for aligning the polarized light has characteristics of transmitting liner polarized light of a predetermined direction and reflecting or absorbing linear polarized light orthogonal to the predetermined direction.

Among the polarizers, a reflective polarizer, which is a type for reflecting one polarized light, can reuse the reflected light by converting the polarizing direction of the reflected light by a wave plate or the like. Thus, the reflective polarizer can achieve high light use efficiency. As a result, power can be saved for the display device.

As the reflective polarizer, a wire grid polarizer having a grid structure (wire grid structure) where many very small thin metal wires are arrayed is widely used. The wire grid structure, in which, for example, a plurality of thin metal wires are arranged in parallel at repeated intervals (pitches) of a hundred and several tens of nm with widths of several tens of nm and heights of hundred nm, is described in detail in, for example, Patent Literature 1.

In the wire grid polarizer, light polarized in a direction orthogonal to the longitudinal direction of the thin metal wire, namely, the extending direction of the thin metal wire, (hereinafter, TM light) is transmitted, while light polarized in a direction parallel to the longitudinal direction of the thin metal wire (hereinafter, TE light) is reflected. As a metallic material for the thin metal wire, aluminum is generally used.

An example of a light-emitting device using such a reflective polarizer is a polarized light emitting diode (polarized LED). This polarized LED is described in, for example, Patent Literature 1. Light emitted from the LED as a light source is not aligned in polarization. Thus, when the light is directly emitted from the LED to the liquid crystal plate, only a half of the emitted light can be used. The polarizing direction of the emitted light can be aligned in one direction by using a polarization conversion element. However, when the polarization conversion element is used, the optical path of the polarized and converted light is added. This doubles the substantial light-emitting area. In such a case, since Etendue as a product of the light-emitting area and a radial solid angle increases, light use efficiency is reduced in the case of use in the projector or the like.

Under these circumstances, there has been offered a structure where the reflective polarizer is disposed on the emitting surface of the LED and one polarized light reflected by the reflective polarizer is returned to the LED side to be reused. This structure can achieve high light use efficiency because polarized light can be aligned without increasing the Etendue. In this structure, since the polarizer is located directly above the LED, the polarizer is exposed to high light density, and the temperature of the polarizer increases. The wire grid structure is highly reliable because it can be made of only an inorganic material, and its life can be long even in an environment where the temperature of the polarizer increases.

CITATION LIST

Patent Literature 1: JP2008-060534A
Nonpatent Literature 1: p. 141104, "30-nm-wide aluminum nanowire grid for ultrahigh contrast and transmittance polarizers made by UV-nanoimprint", by Jian Jim Wang et al., Applied physics letters vol. 89 (2006)

SUMMARY OF INVENTION

Problems to be Solved by Invention

To increase light use efficiency in an optical system using the aforementioned reflective polarizer, it is important to reduce loss in the polarizer. That is, to reduce loss, it is desirable that both transmittance of the TM light and reflectance of the TE light be high.

However, in the case of the wire grid polarizer having a wire grid structure made of aluminum, transmittance of the TM light, namely, 90% to 95%, is relatively high. In this case, however, reflectance of the TE light, namely, about 80% to 85%, is not sufficient. This means that in the wire grid polarizer, 15% to 20% of the TE light is lost each time the TE light is reflected. In particular, when multiple reflection occurs, namely, in the use of the aforementioned polarized LED, there is a problem of large loss.

The present invention has been developed to solve the aforementioned problems, and it is an object of the invention to provide a polarizer capable of increasing light use efficiency, and a light-emitting device.

Solution to Problem

To achieve the object, according to the present invention, a polarizer includes a wire grid structure having a plurality of thin metal wires arranged to extend in one direction. The thin metal wire is formed by stacking a first metal layer including aluminum and a second metal layer including one element from among gold, silver, and copper. The second metal layer is disposed on a side wherein incoming light enters the wire grid structure.

A light-emitting device according to the present invention includes the polarizer of the present invention, and a light-emitting diode having the polarizer disposed on a side of the exit plane wherein light is emitted. At least a part of light reflected by the polarizer enters the light-emitting diode.

Effects of Invention

According to the present invention, the reflectance of TE light can be increased to achieve high light use efficiency. As a result, according to the present invention, power can be saved for a display device.

DESCRIPTION OF EMBODIMENTS

Hereinafter, the embodiments of the present invention will be described with reference to the drawings.

Figure 1:
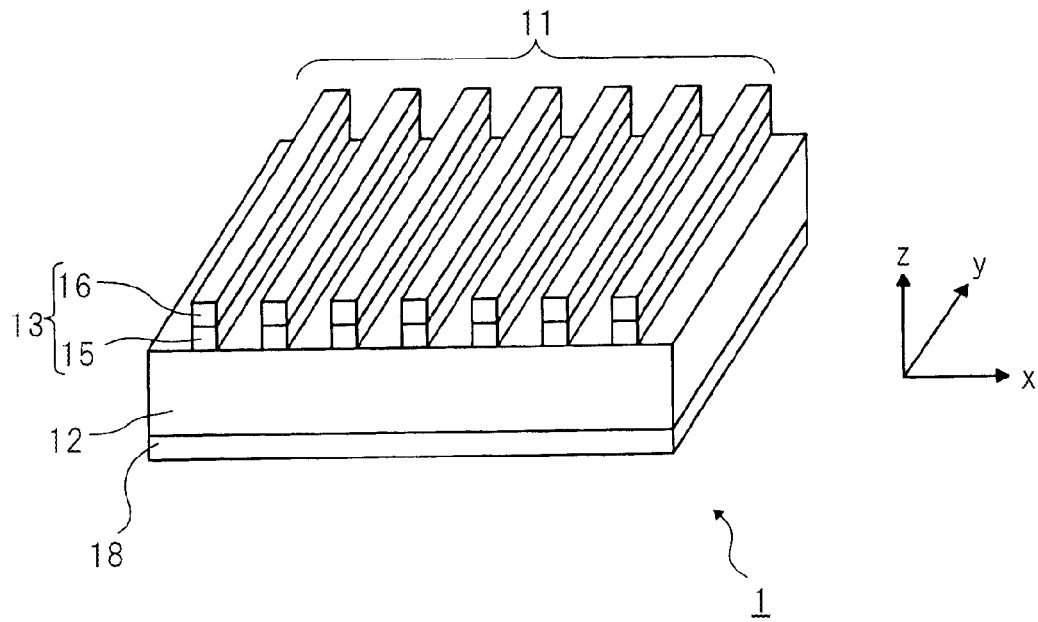
FIG. 1 A perspective view schematically showing the structure of a polarizer according to a first embodiment.

FIG. is a perspective view schematically showing a polarizer according to a first embodiment. As shown in FIG. 1, polarizer 1 according to this embodiment includes wire grid structure 11 where a plurality of very small thin metal wires 13 are arranged at fixed intervals to extend in one direction, and glass substrate 12 where wire grid structure 11 is formed. Thin metal wire 13 is configured by stacking aluminum layer 15 as a first metal layer and silver layer 16 as a second metal layer. Aluminum layer 15 and silver layer 16 are arranged in order on one surface of glass substrate 12 to form a plurality of thin metal wires 13.

The plurality of thin metal wires 13 are arranged at pitches of 140 nm with widths of 42 nm in an arranging direction, and aluminum layer 15 and silver layer 16 are respectively formed with thicknesses of 80 nm and 40 nm. A refractive index of glass substrate 12 is 1.5. A rear surface opposite the one surface of glass substrate 12 on which thin metal wires 13 have been formed is covered with antireflection film 18.

Figure 2A:
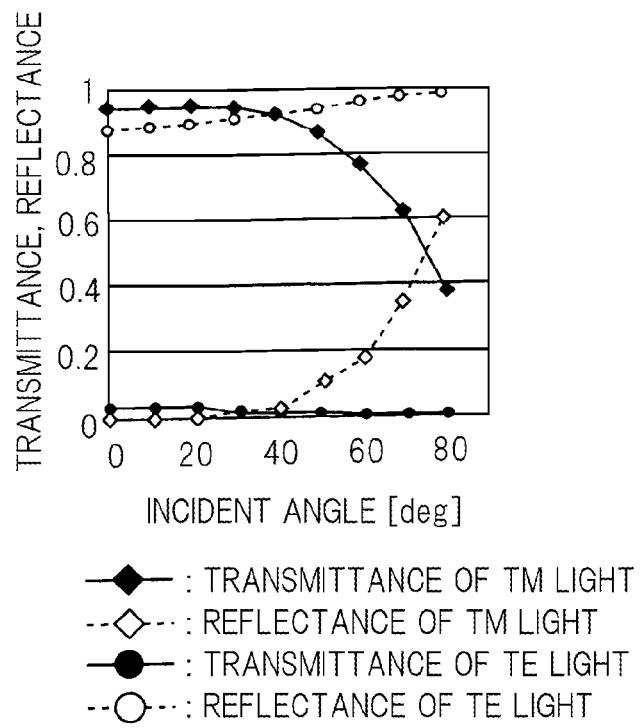
FIG. 2A A graph showing the relationship between the inclination of incident light in a direction orthogonal to the longitudinal direction of a thin metal wire and reflectance, and the relationship between the inclination of incident light in a direction orthogonal to the longitudinal direction of a thin metal wire and transmittance, in the polarizer according to the first embodiment.
Figure 2B:
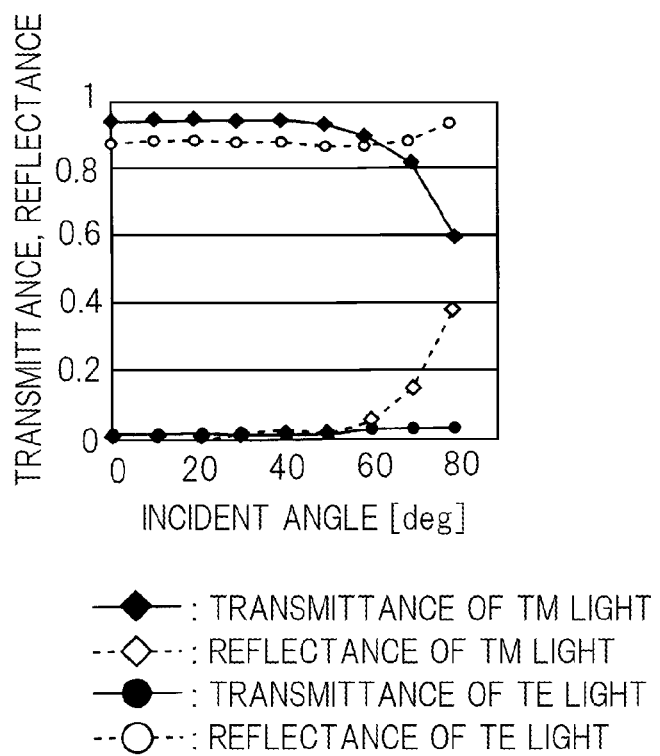
FIG. 2B A graph showing the relationship between the inclination of the incident light in the longitudinal direction of the thin metal wire and reflectance, and the relationship between the inclination of the incident light in the longitudinal direction of the thin metal wire and transmittance, in the polarizer according to the first embodiment.
Figure 3A:
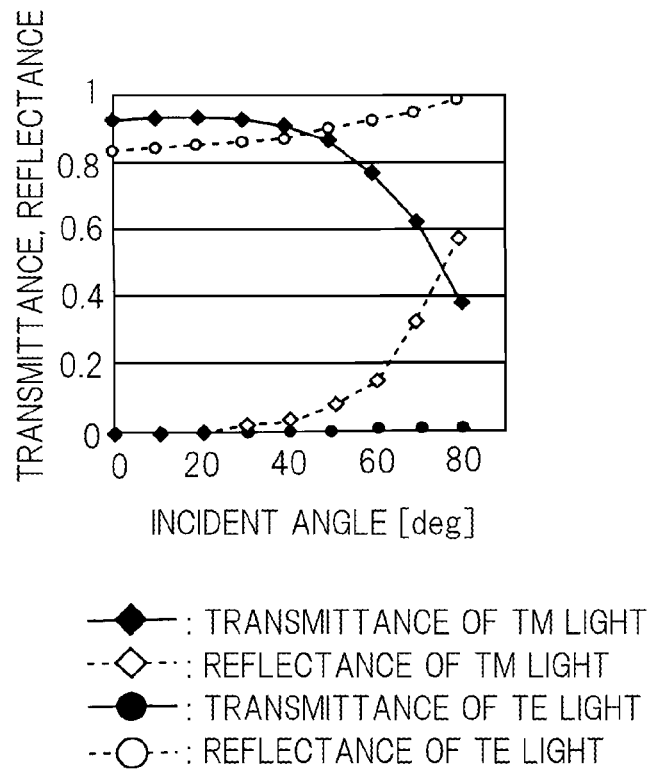
FIG. 3A A graph showing the relationship between the inclination of incident light in a direction orthogonal to the longitudinal direction of a thin metal wire and reflectance, and the relationship between the inclination of incident light in a direction orthogonal to the longitudinal direction of a thin metal wire and transmittance, in a polarizer having a thin metal wire made of only an aluminum layer.
Figure 3B:
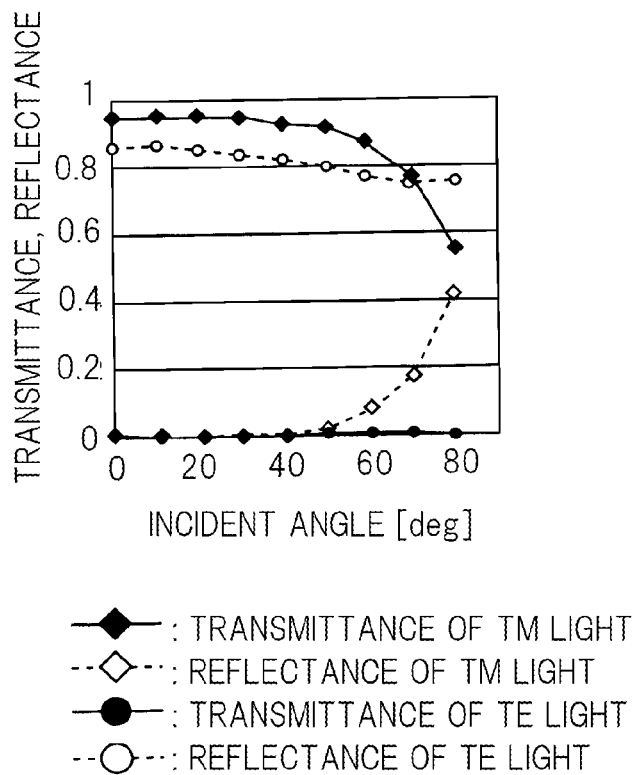
FIG. 3B A graph showing the relationship between the inclination of the incident light in the longitudinal direction of the thin metal wire and reflectance, and the relationship between the inclination of the incident light in the longitudinal direction of the thin metal wire and transmittance, in the polarizer having the thin metal wire made of only the aluminum layer.
Figure 4A:
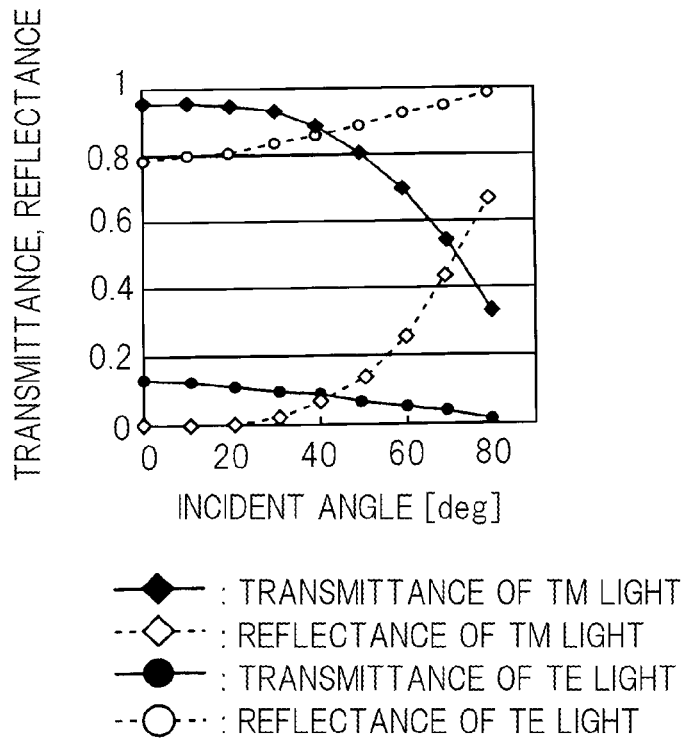
FIG. 4A A graph showing the relationship between the inclination of incident light in a direction orthogonal to the longitudinal direction of a thin metal wire and reflectance, and the relationship between the inclination of incident light in a direction orthogonal to the longitudinal direction of a thin metal wire and transmittance, in a polarizer having a thin metal wire made of only a silver layer.
Figure 4B:
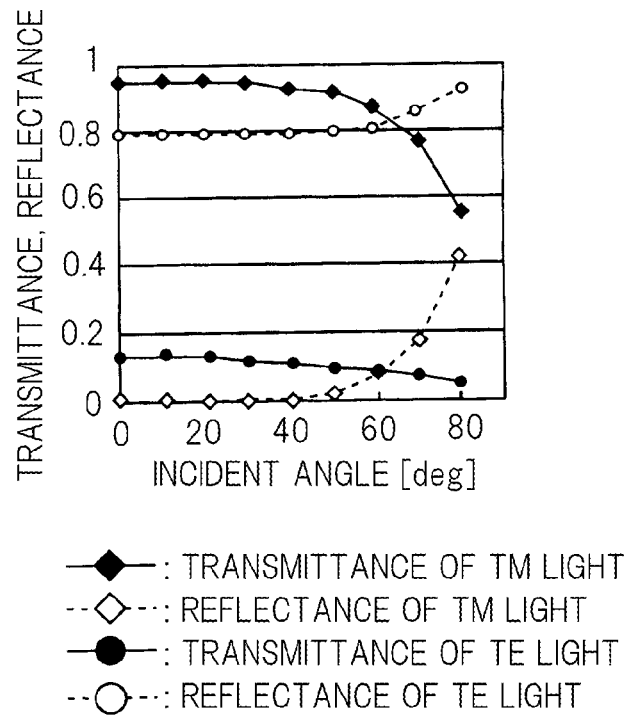
FIG. 4B A graph showing the relationship between the inclination of the incident light in the longitudinal direction of the thin metal wire and reflectance, and the relationship between the inclination of the incident light in the longitudinal direction of the thin metal wire and transmittance, in the polarizer having the thin metal wire made of only the silver layer.
Figure 5A:
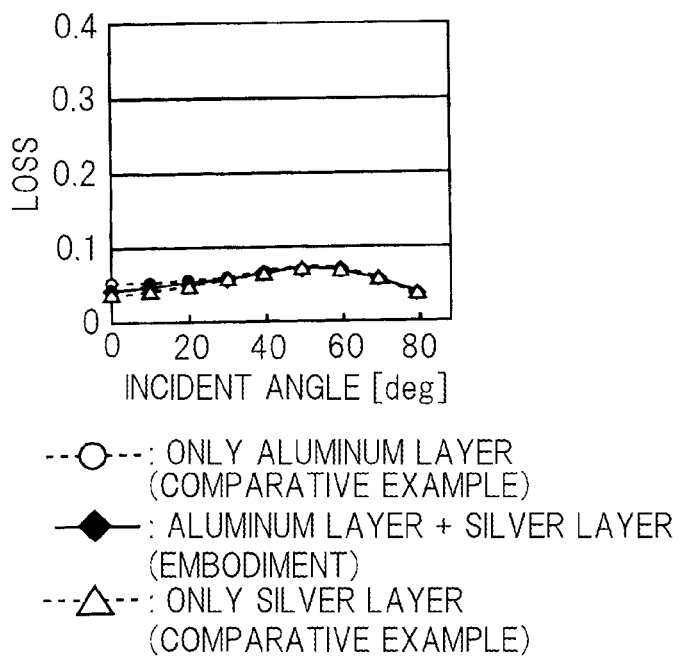
FIG. 5A A graph showing the relationship between the inclination of the incident light in the direction orthogonal to the longitudinal direction of the thin metal wire and the loss of transmitted light (TM light).
Figure 5B:
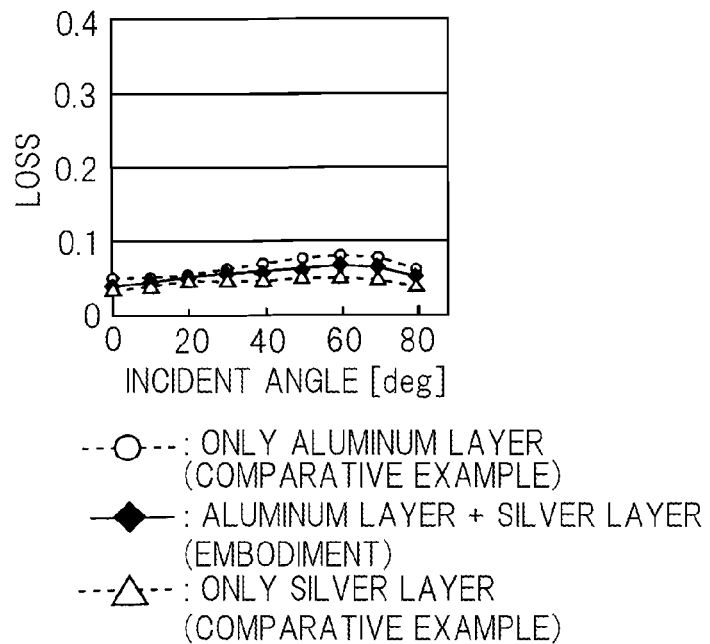
FIG. 5B A graph showing the relationship between the inclination of the incident light in the longitudinal direction of the thin metal wire and the loss of the transmitted light (TM light).
Figure 5C:
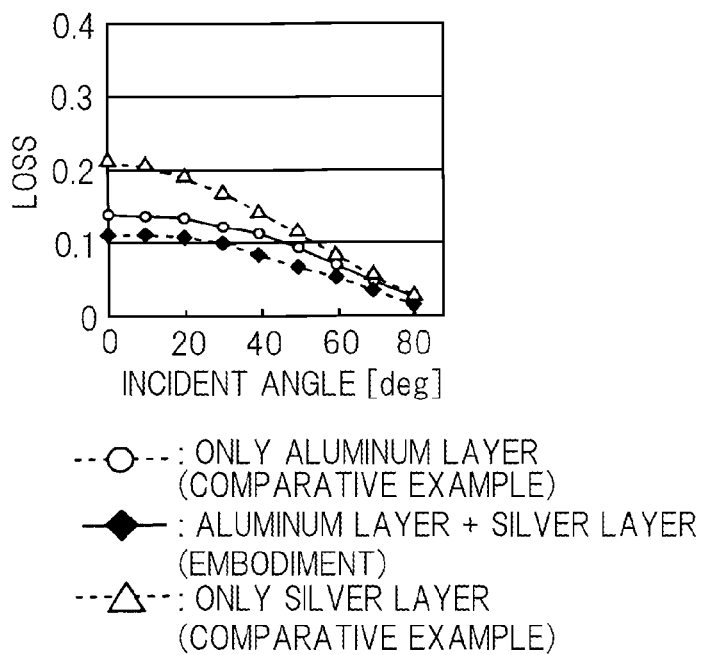
FIG. 5C A graph showing the relationship between the inclination of the incident light in the direction orthogonal to the longitudinal direction of the thin metal wire and the loss of reflected light (TE light).
Figure 5D:
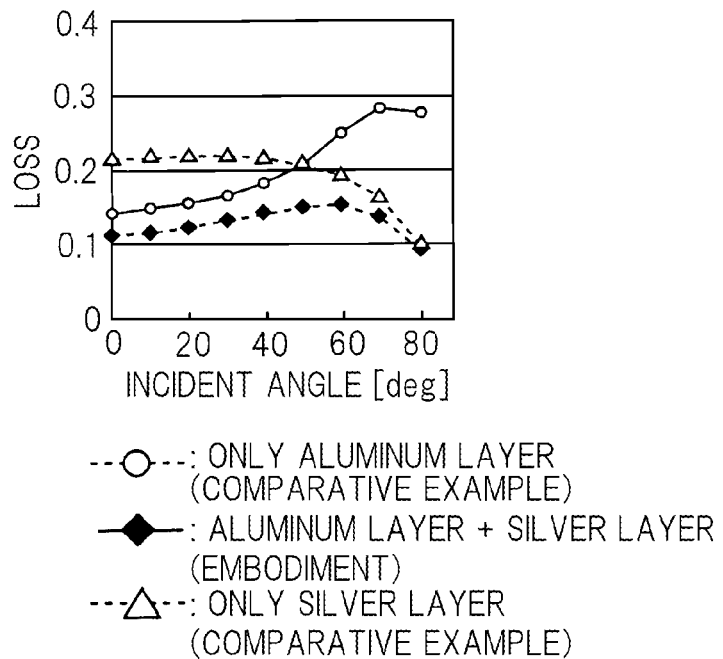
FIG. 5D A graph showing the relationship between the inclination of the incident light in the longitudinal direction of the thin metal wire and the loss of the reflected light (TE light).
Figure 6A:
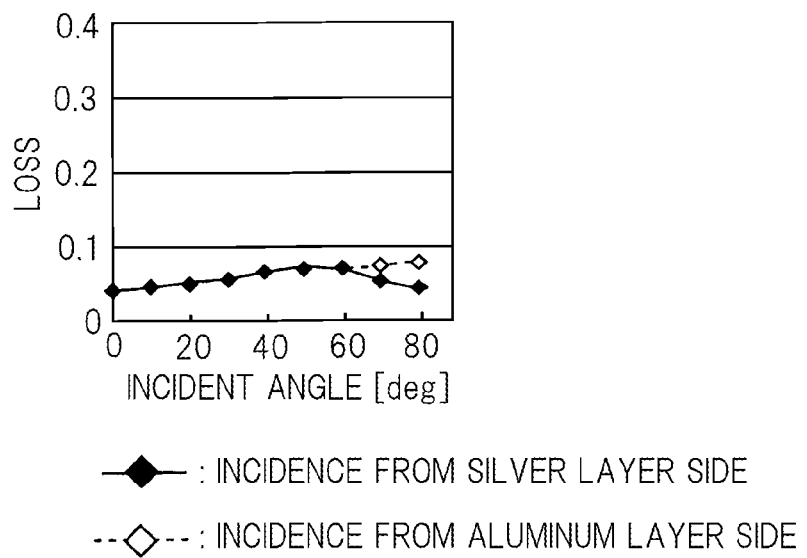
FIG. 6A A graph showing the relationship between the inclination of the incident light in the direction orthogonal to the longitudinal direction of the thin metal wire and the loss of the transmitted light (TM light).
Figure 6B:
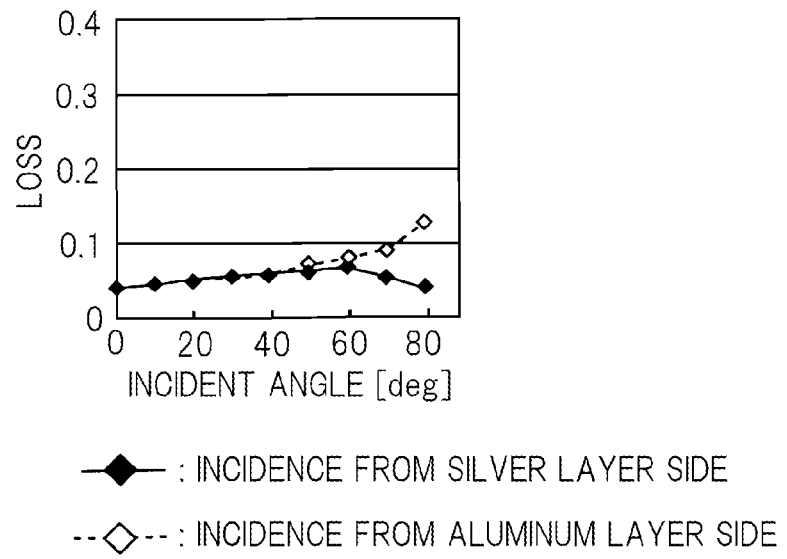
FIG. 6B A graph showing the relationship between the inclination of the incident light in the longitudinal direction of the thin metal wire and the loss of the transmitted light (TM light).
Figure 6C:
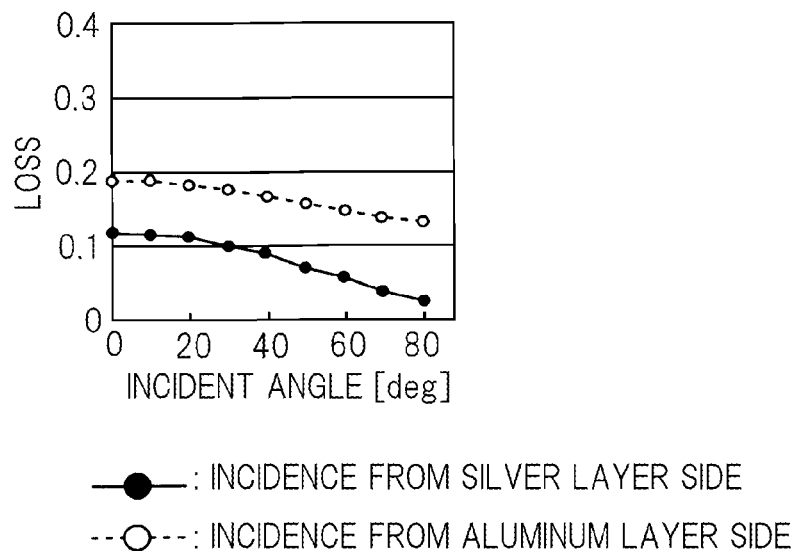
FIG. 6C A graph showing the relationship between the inclination of the incident light in the direction orthogonal to the longitudinal direction of the thin metal wire and the loss of the reflected light (TE light).
Figure 6D:
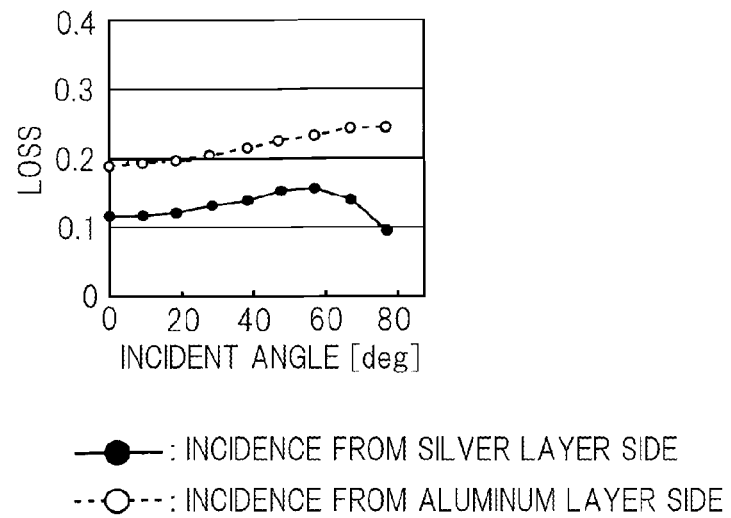
FIG. 6D A graph showing the relationship between the inclination of the incident light in the longitudinal direction of the thin metal wire and the loss of the reflected light (TE light).

FIGS. 2A and 2B respectively show the results of calculating reflectances and transmittances of TE light and TM light when light having a wavelength of 530 nm is entered to polarizer 1 according to this embodiment from a side where thin metal wires 13 have been arranged, namely, silver layer 16 side of thin metal wires 13. In the calculation, RCWA (Rigorous Coupled Wave Analysis) is used, and reflection on the rear surface of glass substrate 12 is completed eliminated by antireflection film 18.

FIG. 2A shows reflectance and transmittance of each of TE light and TM light with respect to the inclination of incident light in a direction orthogonal to the longitudinal direction of thin metal wire 13, namely, an incident angle within an xz plane shown in FIG. 1. Similarly, FIG. 2B shows reflectance and transmittance of each of TE light and TM light with respect to the inclination of the incoming light relative to the longitudinal direction of thin metal wire 13, namely, an incident angle within a yz plane shown in FIG. 1. The incident angle within the xz plane and the incident angle within the yz plane indicate inclined angles in a z direction, namely, a stacking direction where aluminum layer 15 and silver layer 16 are stacked to constitute thin metal wire 13.

For comparison with this embodiment, FIGS. 3A and 3B and FIGS. 4A and 4B respectively show characteristics of a polarizer according to a first comparative example where a plurality of thin metal wires are equal in pitch and width to that of the embodiment but includes only an aluminum layer having a thickness of 120 nm and a polarizer according to a second comparative example where a plurality of thin metal wires similarly include only a silver layer. When the embodiment shown in FIGS. 2A and 2B is compared with the respective comparative examples shown in FIGS. 3A and 3B and FIGS. 4A and 4B, the polarizer of the embodiment is higher in reflectance of the TE light than the comparative examples while approximately equal in transmittance of the TM light to the two comparative examples.

FIGS. 5A to 5D illustrate the results of comparing the loss of the embodiment with those of the two comparative examples. The loss is the sum of the absorption loss and transmittance of the TE light while it is the absorption loss of the TM light. The TE light is originally polarized light to be reflected. However, since a part transmitted through the polarizer becomes unnecessary light at a subsequent optical system, transmittance is included in the loss. Ideally, the TM light is totally transmitted. In reality, however, a part of the TM light is reflected, and reflectance is higher especially when the incident angle is large. The reflected TM light is not regarded as a loss in the polarizer because it can be reused.

As shown in FIGS. 5A to 5D, in the structure of this embodiment, loss of the reflected light, namely, the TE light, is significantly smaller than those of the two comparative examples while the loss of transmitted light, namely, the TM light, is approximately equal to those of the two comparative examples.

As described above, in the structure of this embodiment, the loss of the TE light is avoided in comparison to the structures of the two comparative examples where the plurality of thin metal wires are equal in pitch, width, and thickness and each includes a single metal layer. As a result, in this embodiment, the reflectance of the TE light is higher.

FIGS. 6A to 6D show loss when light is entered from glass substrate 12 side, namely, aluminum layer 15 side of thin metal wire 13, in the structure of this embodiment shown in FIG. 1. For comparison, loss when light is entered from a side where thin metal wire 13 is located, namely, a side where silver layer 16 of thin metal layer 13 is located is also shown. As shown in FIGS. 6A to 6D, loss is larger in the case of the entry of the light from aluminum layer 15 side than that in the case of the entry of the light from silver layer 16 side of thin metal wire 13. Thus, in polarizer 1 according to the embodiment, since it is desirable to enter the light from silver layer 16 side of thin metal wire 13 to wire grid structure 11, silver layer 16 is located on the side of the light incident to wire grid structure 11.

As described above, according to this embodiment, as compared with the polarizer related to the present invention, the loss of TE light can be reduced to increase reflectance of TE light. Thus, light use efficiency can be increased. As a result, this embodiment enables power saving for a display device such as a projector.

Next, the other embodiments will be described with reference to the drawings. In the other embodiments, components similar to those of the first embodiment will be denoted by similar reference numerals, and description thereof will be omitted.

Second Embodiment

Figure 7:
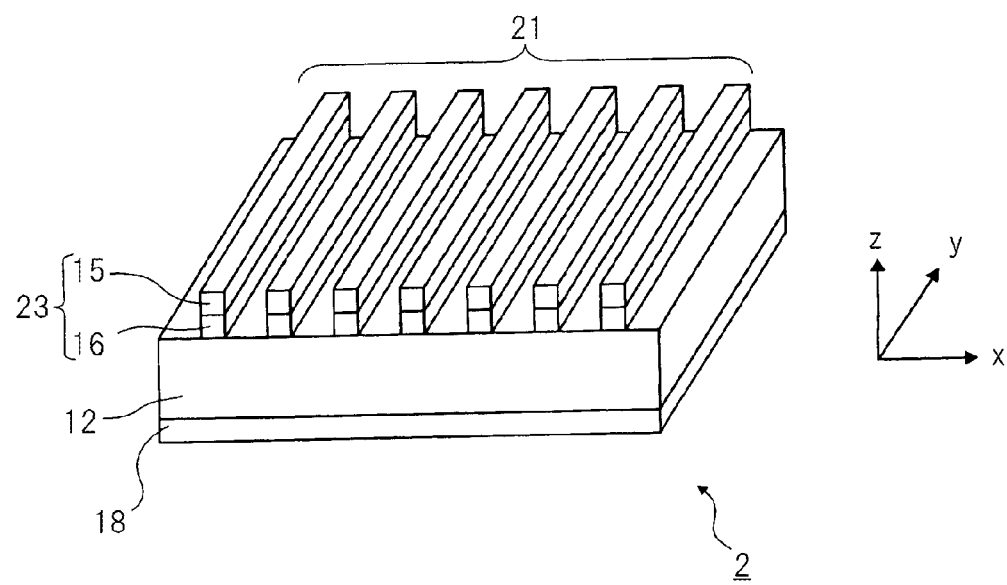
FIG. 7 A perspective view schematically showing the structure of a polarizer according to a second embodiment.

FIG. 7 is a perspective view showing a polarizer according to a second embodiment. The polarizer according to the second embodiment is different from that of the first embodiment in the order of stacking an aluminum layer and a silver layer on a glass substrate to constitute a thin metal wire.

As shown in FIG. 7, polarizer 2 according to the second embodiment includes wire grid structure 21 where a plurality of very small thin metal wires 23 are arranged at fixed intervals to extend in one direction, and glass substrate 12 where wire grid structure 21 is formed. Thin metal wire 13 is configured by stacking silver layer 16 as a first metal layer and aluminum layer 15 as a second metal layer. Silver layer 16 and aluminum layer 15 are arranged in order on glass substrate 12 to form a plurality of thin metal wires 23.

The plurality of thin metal wires 23 are arranged at pitches of 140 nm with widths of 42 nm in an arranging direction, and silver layer 16 and aluminum layer 15 are respectively formed with thicknesses of 40 nm and 80 nm. A refractive index of glass substrate 12 is 1.5. A rear surface opposite the surface of glass substrate 12 on which thin metal wires 23 have been formed is covered with antireflection film 18.

Figure 8A:
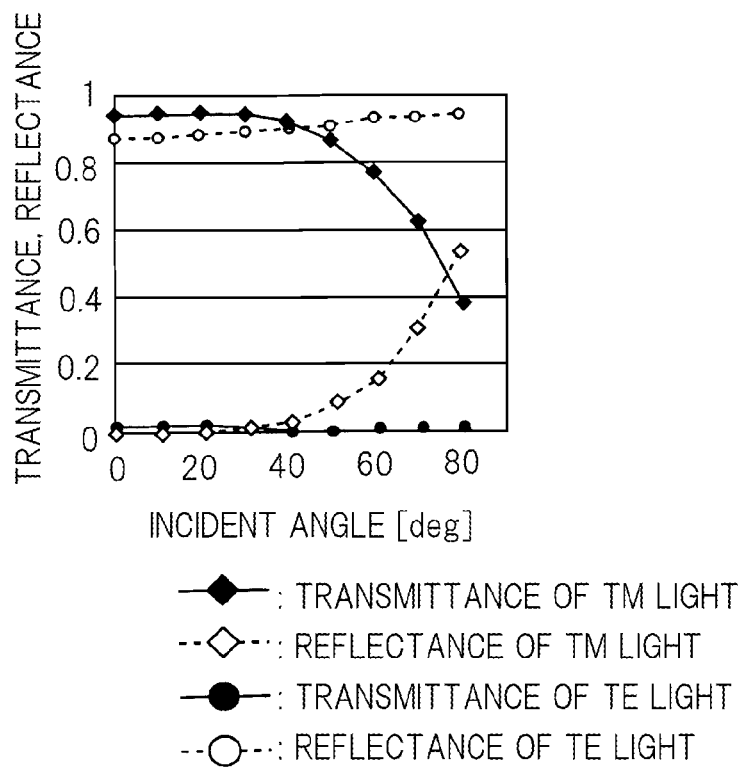
FIG. 8A A graph showing the relationship between the inclination of incident light in a direction orthogonal to the longitudinal direction of a thin metal wire and reflectance, and the relationship between the inclination of incident light in a direction orthogonal to the longitudinal direction of a thin metal wire and transmittance, in a polarizer according to the second embodiment.
Figure 8B:
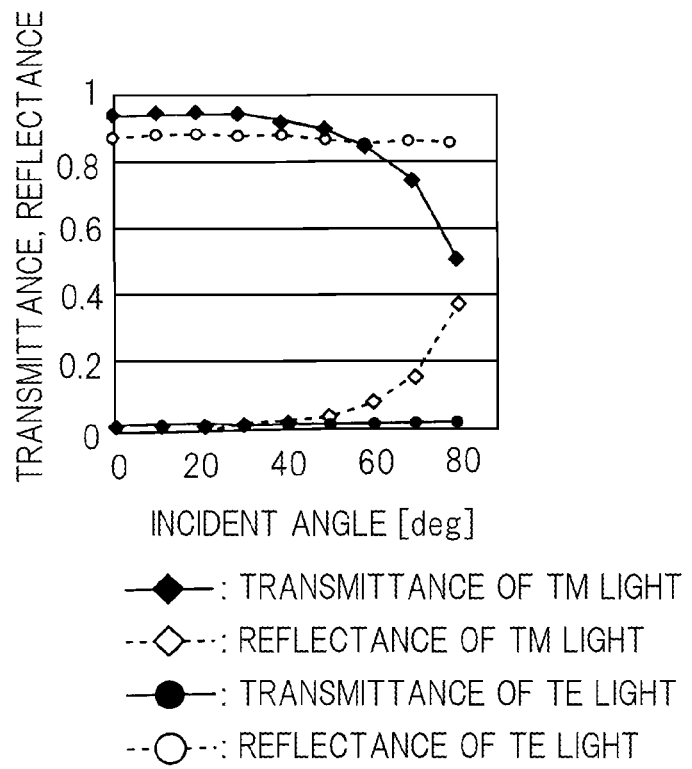
FIG. 8B A graph showing the relationship between the inclination of the incident light in the longitudinal direction of the thin metal wire and reflectance, and the relationship between the inclination of the incident light in the longitudinal direction of the thin metal wire and transmittance, in the polarizer according to the second embodiment.
Figure 9A:
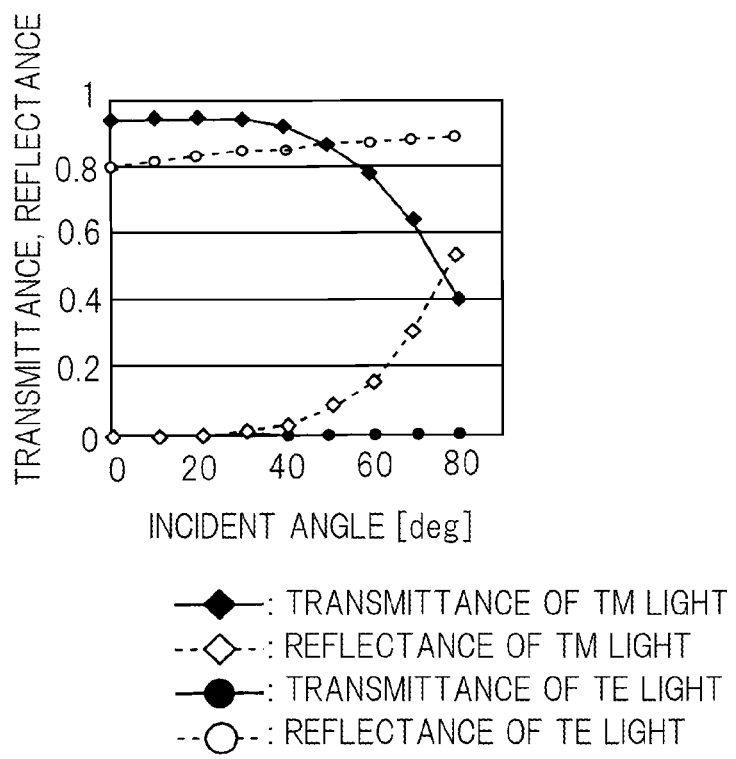
FIG. 9A A graph showing the relationship between the inclination of incident light in a direction orthogonal to the longitudinal direction of a thin metal wire and reflectance, and the relationship between the inclination of incident light in a direction orthogonal to the longitudinal direction of a thin metal wire and transmittance, in a polarizer having a thin metal wire made of only an aluminum layer.
Figure 9B:
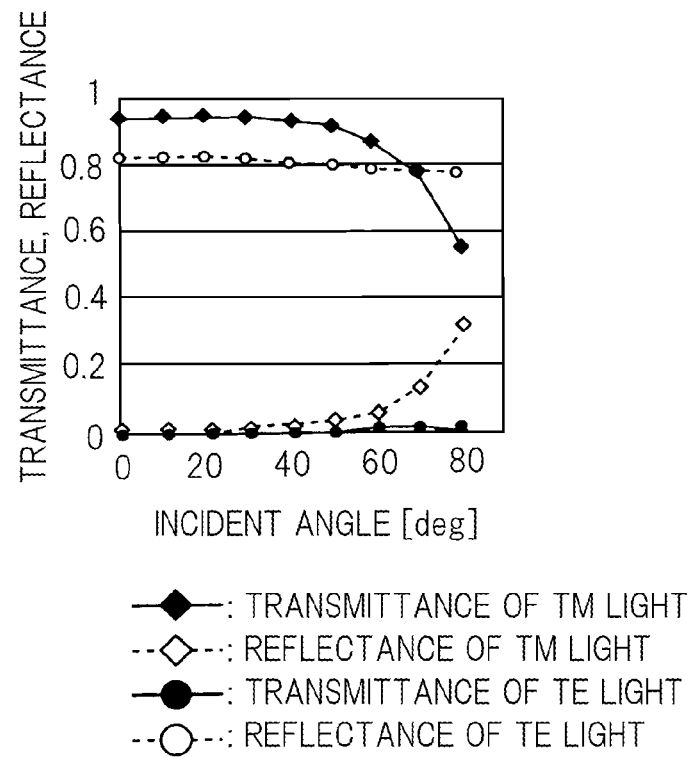
FIG. 9B A graph showing the relationship between the inclination of the incident light in the longitudinal direction of the thin metal wire and reflectance, and the relationship between the inclination of the incident light in the longitudinal direction of the thin metal wire and transmittance, in the polarizer having the thin metal wire made of only the aluminum layer.
Figure 10A:
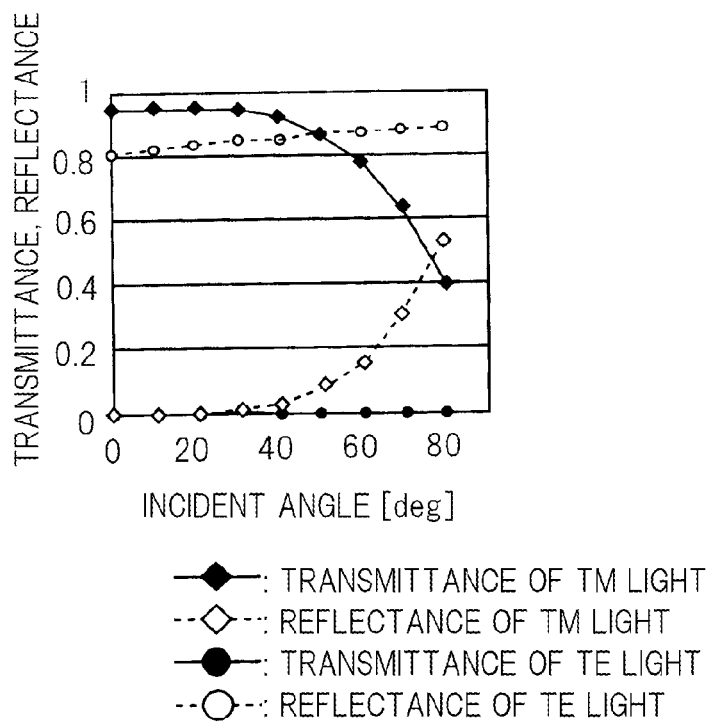
FIG. 10A A graph showing the relationship between the inclination of incident light in a direction orthogonal to the longitudinal direction of a thin metal wire and reflectance, and the relationship between the inclination of incident light in a direction orthogonal to the longitudinal direction of a thin metal wire and transmittance, in a polarizer having a thin metal wire made of only a silver layer.
Figure 10B:
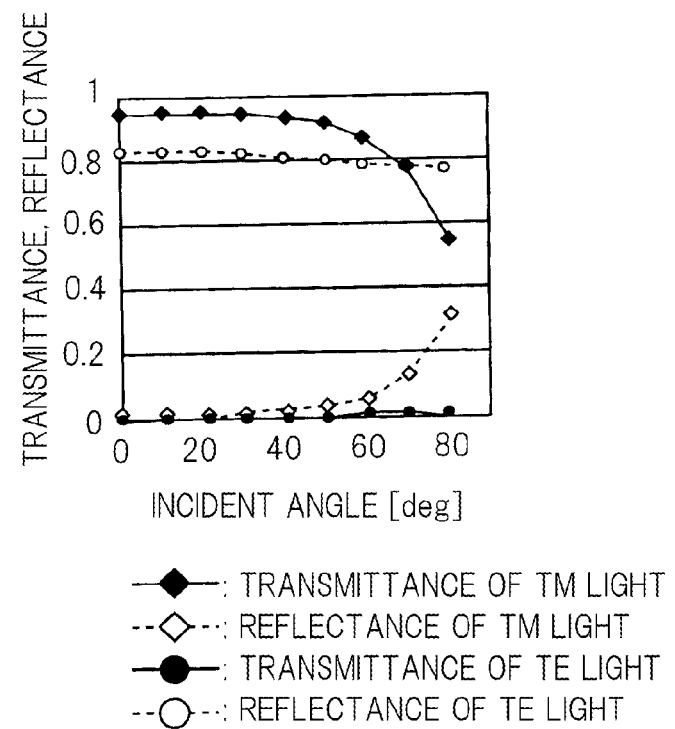
FIG. 10B A graph showing the relationship between the inclination of the incident light in the longitudinal direction of the thin metal wire and reflectance, and the relationship between the inclination of the incident light in the longitudinal direction of the thin metal wire and transmittance, in the polarizer having the thin metal wire made of only the silver layer.
Figure 11A:
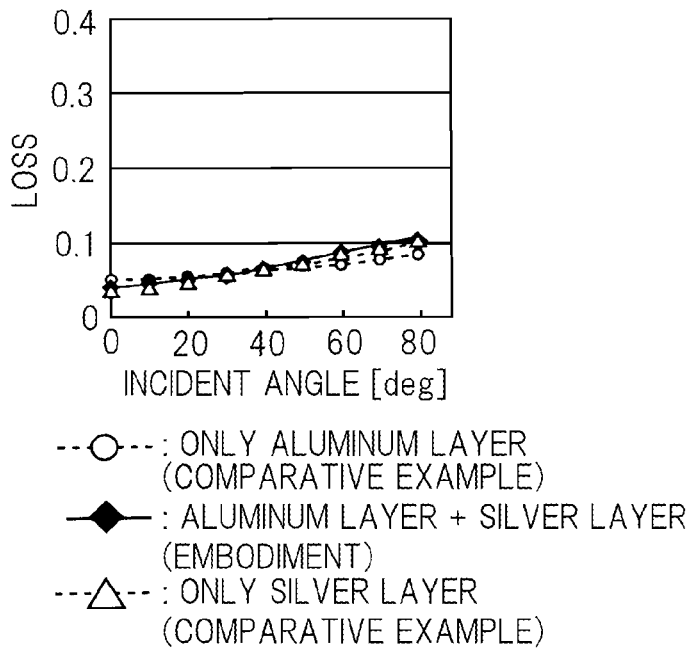
FIG. 11A A graph showing the relationship between the inclination of the incident light in the direction orthogonal to the longitudinal direction of the thin metal wire and the loss of transmitted light (TM light).
Figure 11B:
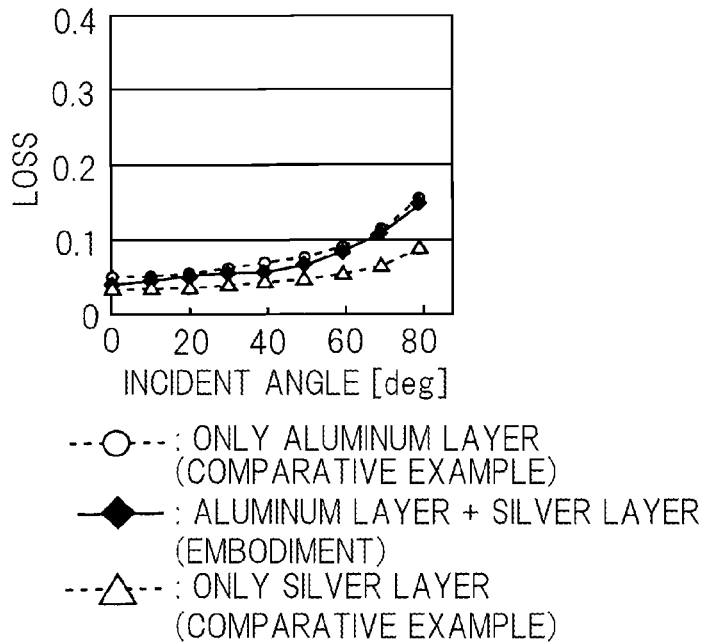
FIG. 11B A graph showing the relationship between the inclination of the incident light in the longitudinal direction of the thin metal wire and the loss of the transmitted light (TM light).
Figure 11C:
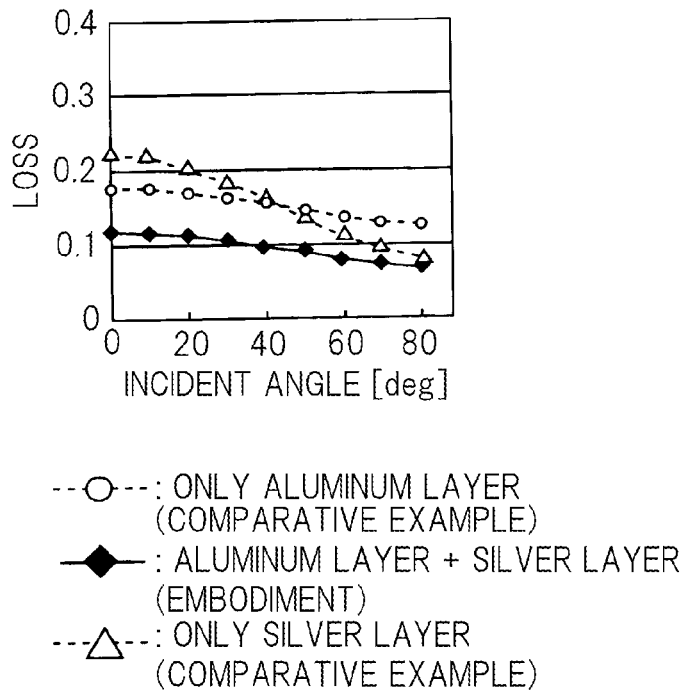
FIG. 11C A graph showing the relationship between the inclination of the incident light in the direction orthogonal to the longitudinal direction of the thin metal wire and the loss of reflected light (TE light).
Figure 11D:
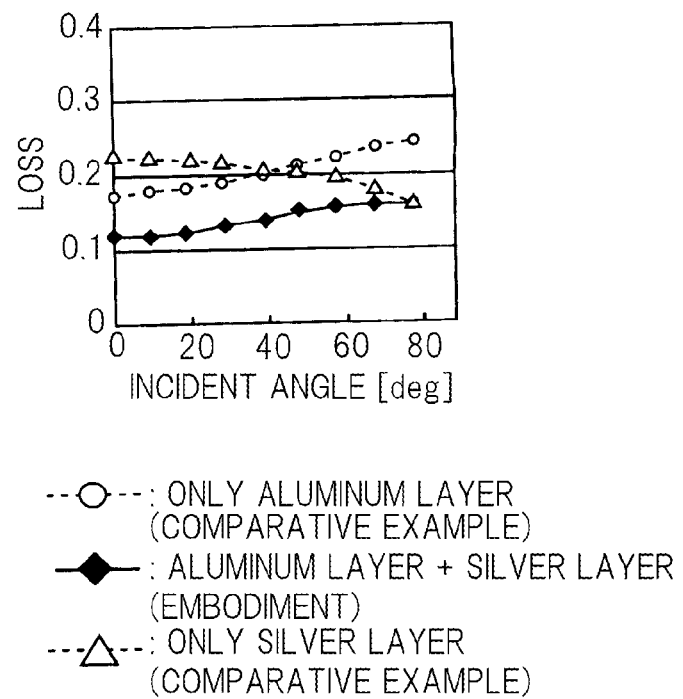
FIG. 11D A graph showing the relationship between the inclination of the incident light in the longitudinal direction of the thin metal wire and the loss of the reflected light (TE light).
Figure 12A:
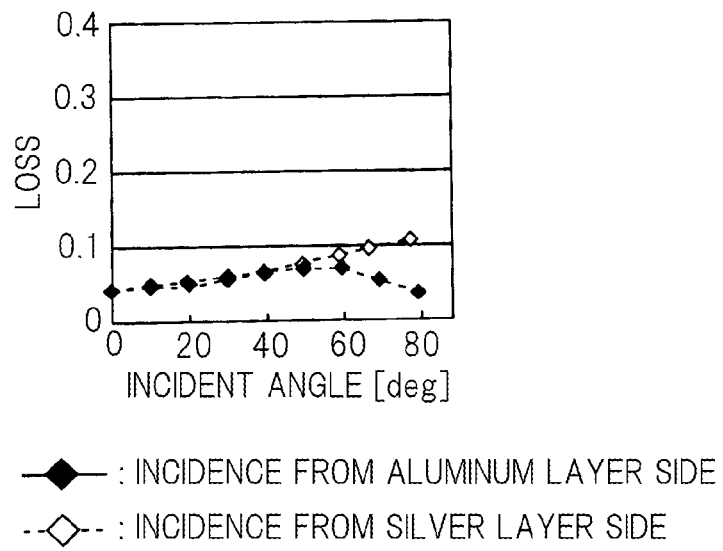
FIG. 12A A graph showing the relationship between the inclination of the incident light in the direction orthogonal to the longitudinal direction of the thin metal wire and the loss of the transmitted light (TM light) concerning the light incident direction dependency of light loss in the polarizer.
Figure 12B:
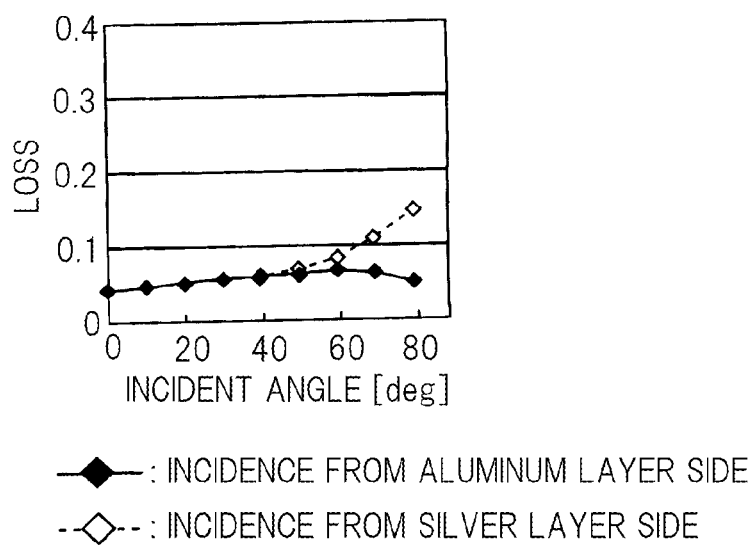
FIG. 12B A graph showing the relationship between the inclination of the incident light in the longitudinal direction of the thin metal wire and the loss of the transmitted light (TM light) concerning the light incident direction dependency of light loss in the polarizer.
Figure 12C:
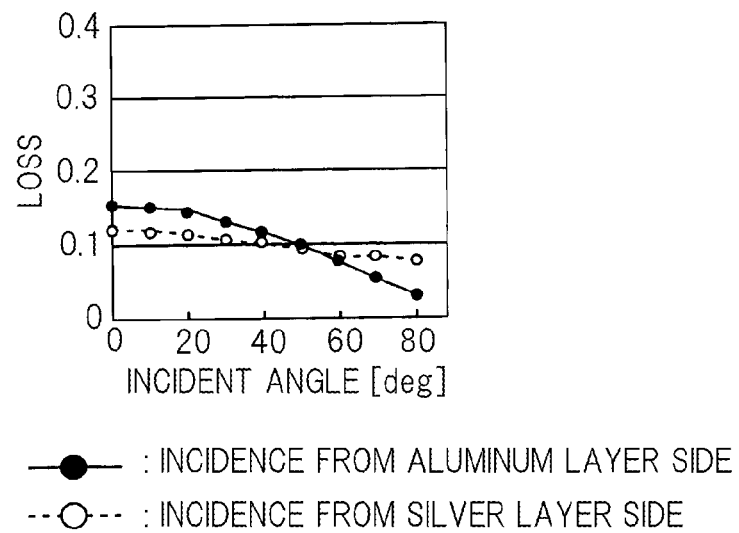
FIG. 12C A graph showing the relationship between the inclination of the incident light in the direction orthogonal to the longitudinal direction of the thin metal wire and the loss of the reflected light (TE light) concerning the light incident direction dependency of light loss in the polarizer.
Figure 12D:
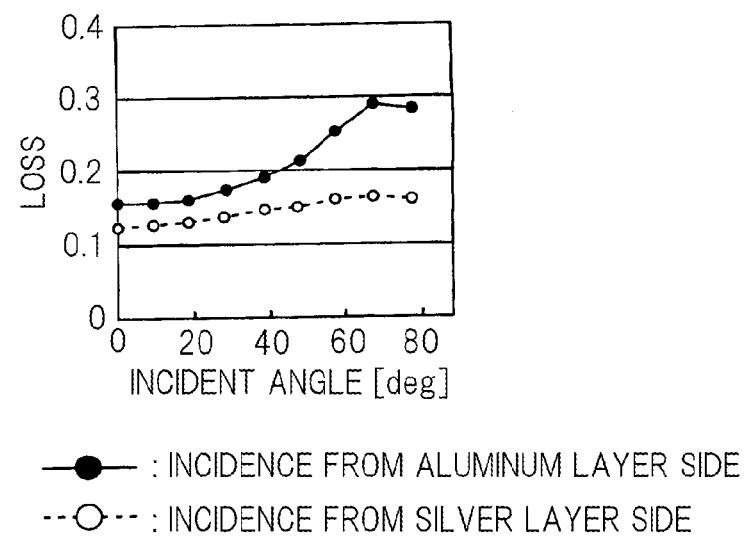
FIG. 12D A graph showing the relationship between the inclination of the incident light in the longitudinal direction of the thin metal wire and the loss of the reflected light (TE light) concerning the light incident direction dependency of light loss in the polarizer.

FIGS. 8A and 8B respectively show the results of calculating reflectances and transmittances of TE light and TM light when light having a wavelength of 530 nm is entered from glass substrate 12 side, namely, silver layer 16 side of thin metal wires 13, in the structure of this embodiment. For comparison with this embodiment, FIGS. 9A and 9B and FIGS. 10A and 10B respectively show characteristics of, when the light is entered from glass substrate 12 side, a polarizer according to a first comparative example where a plurality of thin metal wires are equal in pitch and width to that of the embodiment but includes only an aluminum layer having a thickness of 120 nm and a polarizer according to a second comparative example where a plurality of thin metal wires similarly include only a silver layer. Polarizer 2 of the embodiment is higher in reflectance of the TE light than the comparative examples while approximately equal in transmittance of the TM light to the two comparative examples.

FIGS. 11A to 11D illustrate the results of comparing the loss of the embodiment with those of the two comparative examples. As in the aforementioned case, in the structure of this embodiment, the loss of the reflected light, namely, the TE light, is significantly smaller than those of the two comparative examples while the loss of the transmitted light, namely, the TM light, is approximately equal to those of the two comparative examples.

As described above, in the structure of this embodiment, the loss of the TE light is avoided in comparison to the structures of the two comparative examples where the plurality of thin metal wires are equal in pitch, width, and thickness and each includes a single metal layer. As a result, in this embodiment, the reflectance of the TE light is higher.

FIGS. 12A to 12D show loses when light is entered from a side where thin metal wires 23 have been arranged, namely, aluminum layer 15 side of thin metal wire 23, in the structure of this embodiment shown in FIG. 7. For comparison, a loss when light is entered from glass substrate 12 side, namely, silver layer 16 side of thin metal layer 23, is also shown. While tendencies are different depending on the TE light, the TM light, and the incident direction and an incident angle to the polarizer, loss is generally larger in the case of the entry of the light from the side where thin metal wires 23 have been arranged, namely, aluminum layer 15 side of thin metal wire 23. Thus, as in the aforementioned case, in polarizer 2 according to the embodiment, it is desirable to enter the light from glass substrate 12 side, namely, silver layer 16 side of thin metal wire 23, and silver layer 16 is accordingly located on a side wherein incoming light enters wire grid structure 21.

The influence of the angle of light incident to the polarizer on the loss will be described. As shown in FIGS. 5A to 5D and FIGS. 11A to 11D, in the laminate structure of the aluminum layer and the silver layer, a loss is avoided in comparison to when light is entered from the silver layer side in the stacking direction.

Generally, in a configuration where the refractive index of a layer in contact with the aluminum layer is lower than that of a layer in contact with the silver layer, loss can be smaller. For example, in the first and second embodiments, the pitches, widths, and the thicknesses of the plurality of thin metal wires and the ratios of aluminum layer 15 and silver layer 16 are all equal. However, in the first embodiment, the surface opposite the surface of aluminum layer 15 that is in contact with silver layer 6 is in contact with glass substrate 12 having a refractive index of 1.5. On the other hand, the surface opposite the surface of silver layer 6 that is in contact with aluminum layer 15 is in contact with a surrounding medium, namely, air having a refractive index of 1. In the case of the second embodiment, the relationship between aluminum layer 15 and silver layer 16 is reverse to that of the first embodiment.

When the loss in the first embodiment and the second embodiment, namely, the loss when the light is entered from silver layer 16 side shown in FIGS. 5A to 5D and FIG. 11A to 11D, are compared with each other, the loss is smaller in the first embodiment shown in FIG. 5A to 5D that in the second embodiment. In other words, the loss is smaller in the first embodiment where concerning the surface opposite the surface in contact with aluminum layer 15 and silver layer 16, the refractive index of the layer that is in contact with aluminum layer 15 is higher than that of the layer that is in contact with silver layer 16 than in the second embodiment.

Concerning the point, that is, the loss can be smaller in the configuration where the refractive index of the layer in contact with aluminum layer 15 is lower than that of the layer in contact with silver layer 16, and loss can be similarly smaller when a gold layer or a copper layer is used in place of the silver layer. Specifically, in a wire grid polarizer that includes thin metal wires using the gold layer or the copper layer and the aluminum layer, when light is entered to a wire grid structure, it is desirable to enter the light not from the aluminum layer side but from the gold layer side. A configuration where, concerning the surface opposite the surface in contact with the aluminum layer, the gold layer, or the copper layer, the refractive index of the layer in contact with the aluminum layer is higher than that of the layer that is in contact with the gold layer or the copper layer is desirable for reducing losses.

Third Embodiment

Figure 13:
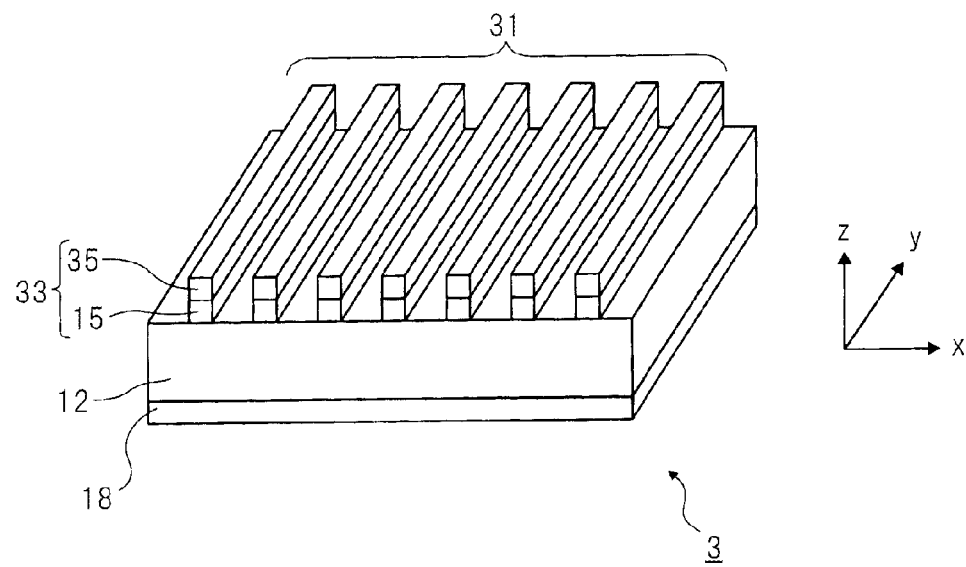
FIG. 13 A perspective view schematically showing the structure of a polarizer according to a third embodiment.

FIG. 13 is a perspective view showing a polarizer according to a third embodiment. The polarizer according to the third embodiment is different from those of the foregoing embodiments in that a thin metal wire is formed by stacking an aluminum layer and a gold layer.

As shown in FIG. 13, polarizer 3 according to the third embodiment includes wire grid structure 31 where a plurality of very small thin metal wires 33 are arranged at fixed intervals to extend in one direction, and glass substrate 12 where wire grid structure 31 is formed. Thin metal wire 33 is configured by stacking aluminum layer 15 as a first metal layer and gold layer 35 as a second metal layer. Aluminum layer 15 and gold layer 35 are arranged in order on glass substrate 12 to form a plurality of thin metal wires 33.

The plurality of thin metal wires 33 are arranged at pitches of 170 nm with widths of 51 nm in an arranging direction, and aluminum layer 15 and gold layer 35 are respectively formed with thicknesses of 80 nm and 40 nm. A refractive index of glass substrate 12 is 1.5. A rear surface opposite the surface of glass substrate 12 on which thin metal wires 33 have been formed is covered with antireflection film 18.

Figure 14A:
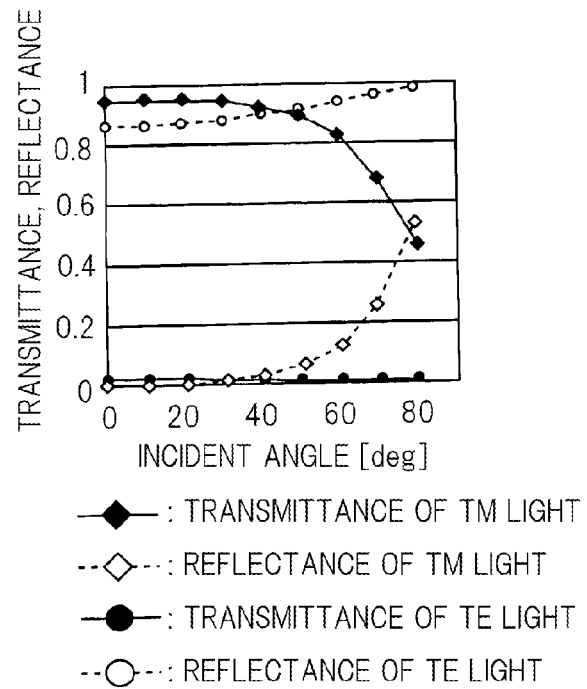
FIG. 14A A graph showing the relationship between the inclination of incident light in a direction orthogonal to the longitudinal direction of a thin metal wire and reflectance, and the relationship between the inclination of incident light in a direction orthogonal to the longitudinal direction of a thin metal wire and transmittance, in the polarizer according to the third embodiment.
Figure 14B:
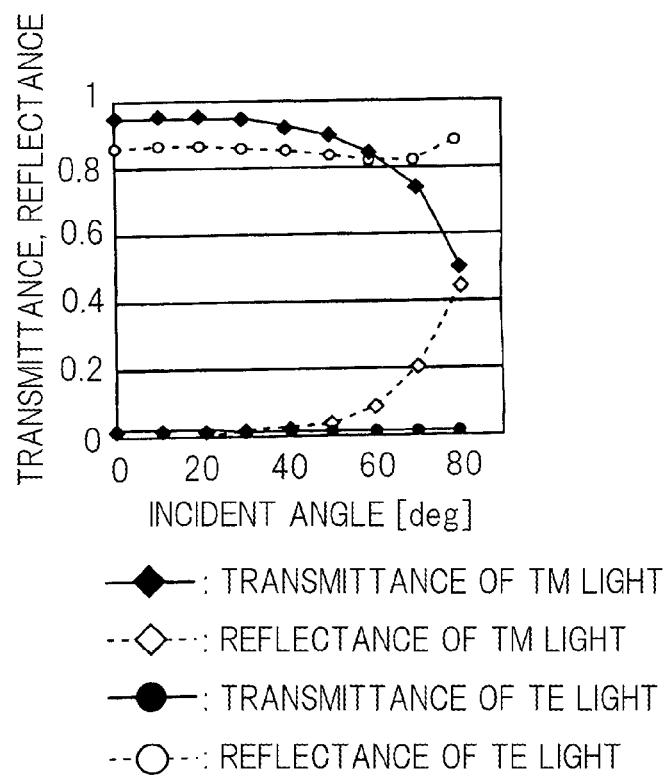
FIG. 14B A graph showing the relationship between the inclination of the incident light in the longitudinal direction of the thin metal wire and reflectance, and the relationship between the inclination of the incident light in the longitudinal direction of the thin metal wire and transmittance, in the polarizer according to the third embodiment.

FIGS. 14A and 14B respectively show the results of calculating reflectances and transmittances of TE light and TM light when light having a wavelength of 650 nm is entered from a side where thin metal wires 33 have been arranged, namely, gold layer 35 side of thin metal wires 13, in the structure of this embodiment. For comparison with this embodiment, FIGS. 15A and 15B and FIGS. 16A and 16B respectively show characteristics of a polarizer according to a first comparative example where each of the wires in a plurality of thin metal wires is equal in pitch and width to that of the embodiment but includes only an aluminum layer having a thickness of 120 nm and a polarizer according to a second comparative example where a plurality of thin metal wires similarly include only a gold layer. Polarizer 3 of the embodiment is higher in reflectance of the TE light than the comparative examples while approximately equal in transmittance of the TM light to the two comparative examples.

FIGS. 17A to 17D illustrate the results of comparing the loss in the embodiment with the loss in the two comparative examples. As in the aforementioned case, in the structure of this embodiment, the loss of reflected light, namely, the TE light, is smaller than the loss in the two comparative examples while the loss of transmitted light, namely, the TM light, is approximately equal to the loss in the two comparative examples.

Fourth Embodiment

Figure 18:
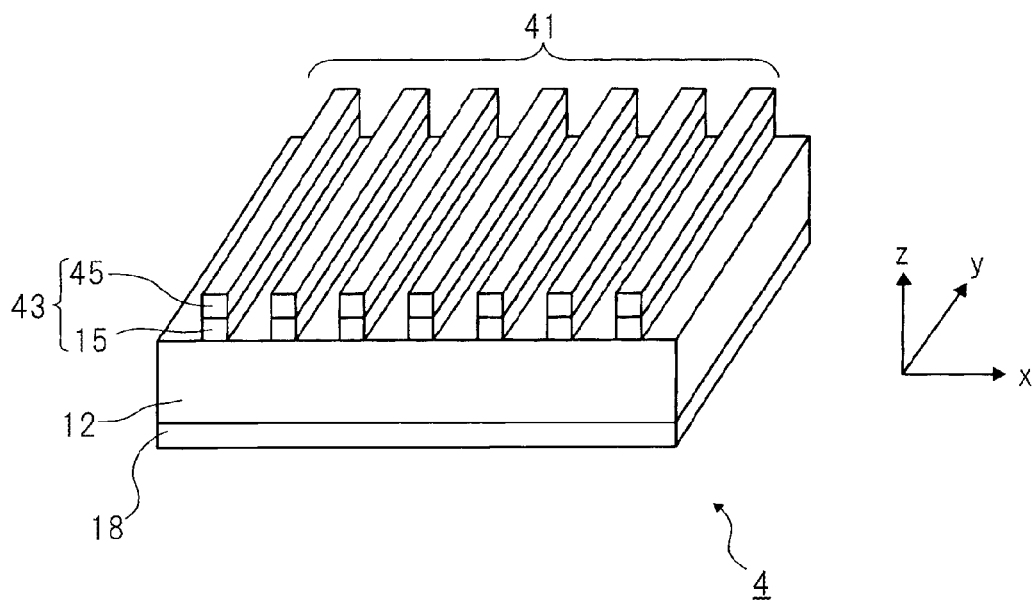
FIG. 18 A perspective view schematically showing the structure of a polarizer according to a fourth embodiment.

FIG. 18 is a perspective view showing a polarizer according to a fourth embodiment. The polarizer according to the fourth embodiment is different from the polarizers of the foregoing embodiments in that a thin metal wire is formed by stacking an aluminum layer and a copper layer.

As shown in FIG. 18, polarizer 4 according to the fourth embodiment includes wire grid structure 41 where a plurality of very small thin metal wires 33 are arranged at fixed intervals to extend in one direction, and glass substrate 12 where wire grid structure 41 is formed. Thin metal wire 43 is configured by stacking aluminum layer 15 as a first metal layer and copper layer 45 as a second metal layer. Aluminum layer 15 and copper layer 45 are arranged in order on glass substrate 12 to form a plurality of thin metal wires 43.

The plurality of thin metal wires 43 are arranged at pitches of 170 nm with widths of 51 nm in an arranging direction, and aluminum layer 15 and copper layer 45 are respectively formed with thicknesses of 80 nm and 40 nm. A refractive index of glass substrate 12 is 1.5. A rear surface opposite the surface of glass substrate 12 on which thin metal wires 43 have been formed is covered with antireflection film 18.

Figure 15A:
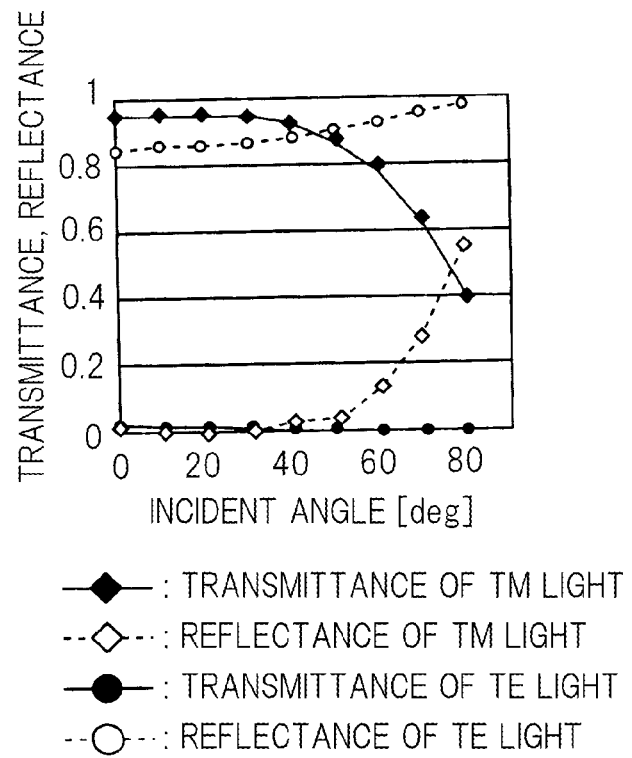
FIG. 15A A graph showing the relationship between the inclination of incident light in a direction orthogonal to the longitudinal direction of a thin metal wire and reflectance, and the relationship between the inclination of incident light in a direction orthogonal to the longitudinal direction of a thin metal wire and transmittance, in a polarizer having a thin metal wire made of only an aluminum layer.
Figure 15B:
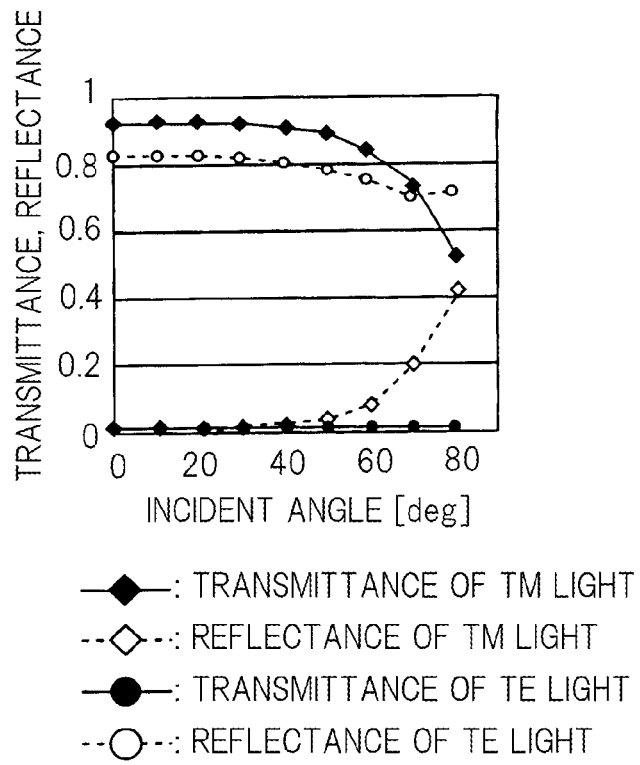
FIG. 15B A graph showing the relationship between the inclination of the incident light in the longitudinal direction of the thin metal wire and reflectance, and the relationship between the inclination of the incident light in the longitudinal direction of the thin metal wire and transmittance, in the polarizer having the thin metal wire made of only the aluminum layer.
Figure 16A:
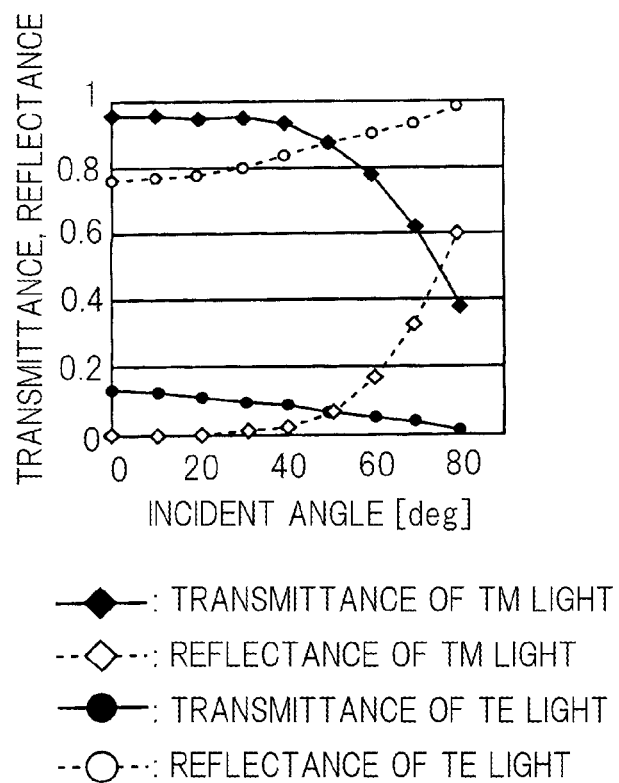
FIG. 16A A graph showing the relationship between the inclination of incident light in a direction orthogonal to the longitudinal direction of a thin metal wire and reflectance, and the relationship between the inclination of incident light in a direction orthogonal to the longitudinal direction of a thin metal wire and transmittance, in a polarizer having a thin metal wire made of only a gold layer.
Figure 16B:
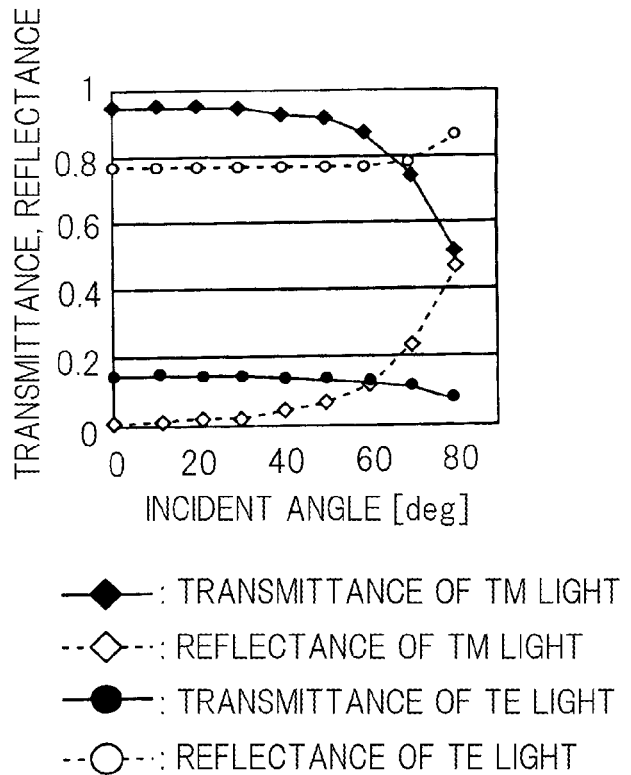
FIG. 16B A graph showing the relationship between the inclination of the incident light in the longitudinal direction of the thin metal wire and reflectance, and the relationship between the inclination of the incident light in the longitudinal direction of the thin metal wire and transmittance, in the polarizer having the thin metal wire made of only the gold layer.
Figure 17A:
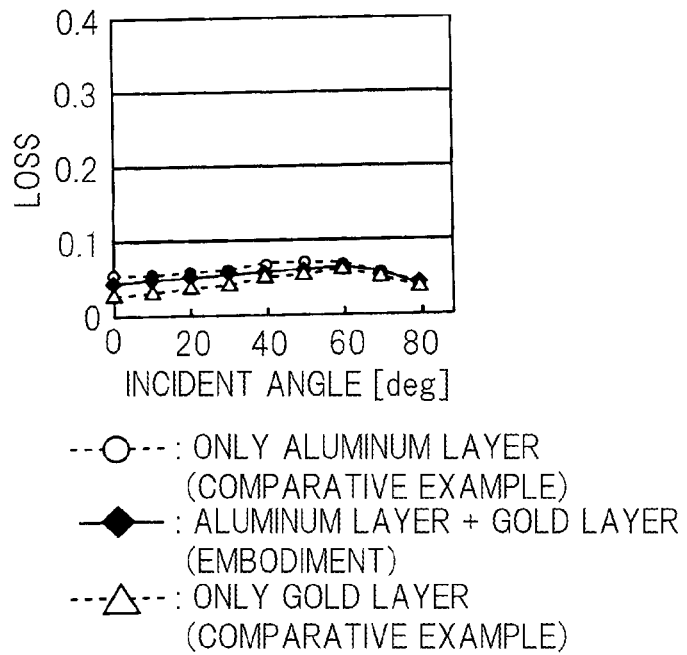
FIG. 17A A graph showing the relationship between the inclination of the incident light in the direction orthogonal to the longitudinal direction of the thin metal wire and the loss of transmitted light (TM light).
Figure 17B:
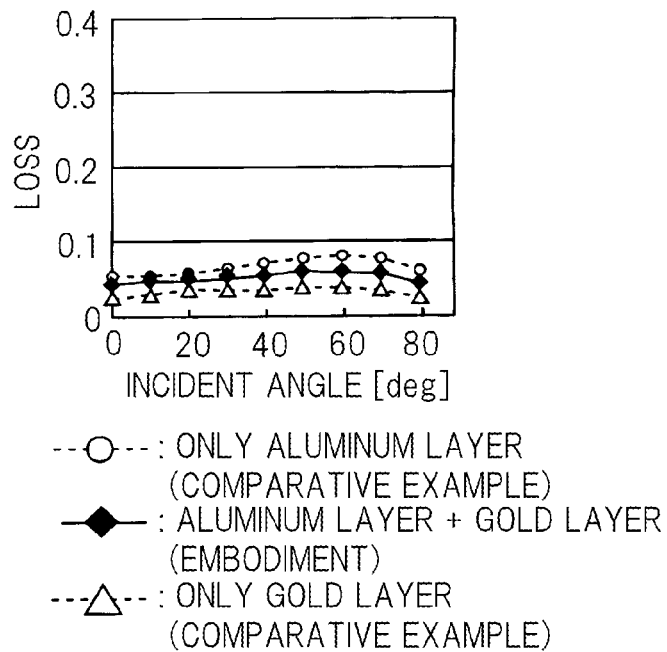
FIG. 17B A graph showing the relationship between the inclination of the incident light in the longitudinal direction of the thin metal wire and the loss of the transmitted light (TM light).
Figure 17C:
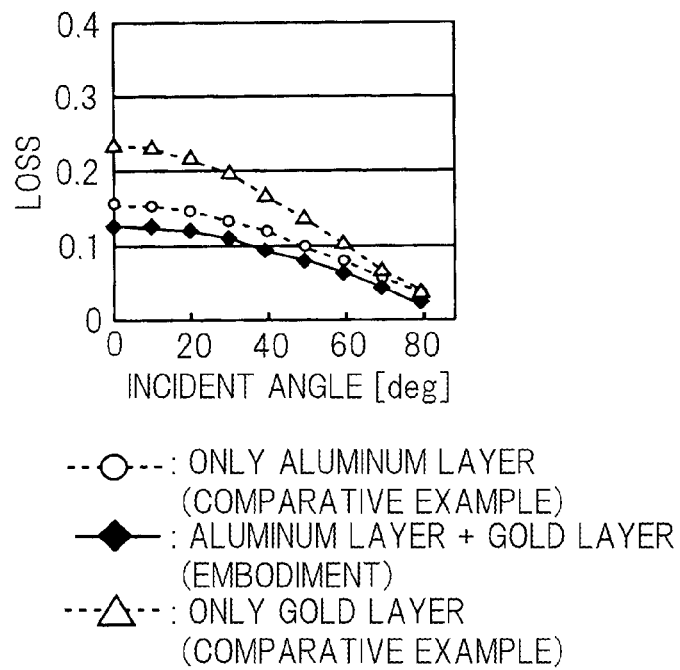
FIG. 17C A graph showing the relationship between the inclination of the incident light in the direction orthogonal to the longitudinal direction of the thin metal wire and the loss of reflected light (TE light).
Figure 17D:
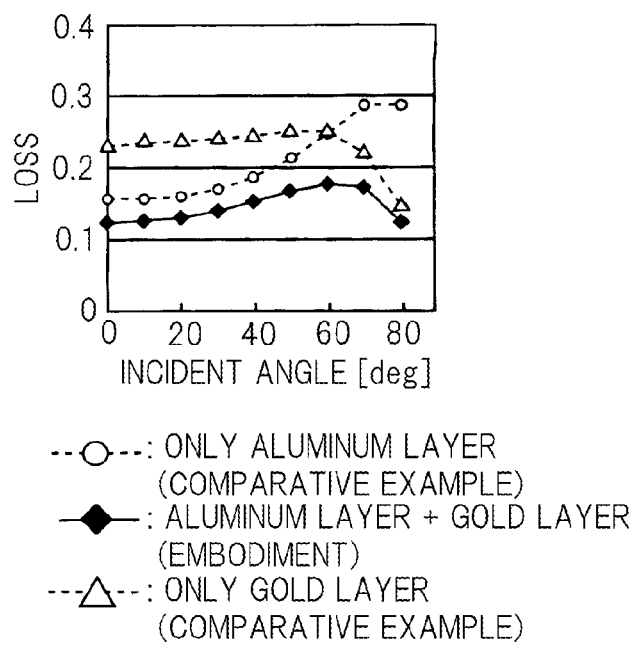
FIG. 17D A graph showing the relationship between the inclination of the incident light in the longitudinal direction of the thin metal wire and the loss of the reflected light (TE light).
Figure 19A:
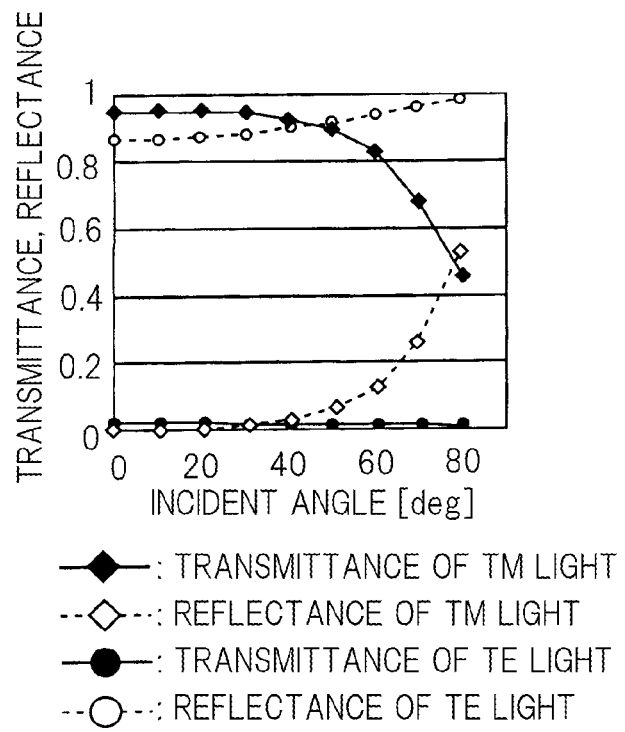
FIG. 19A A graph showing the relationship between the inclination of incident light in a direction orthogonal to the longitudinal direction of a thin metal wire and reflectance, and the relationship between the inclination of incident light in a direction orthogonal to the longitudinal direction of a thin metal wire and transmittance, in the polarizer according to the fourth embodiment.
Figure 19B:
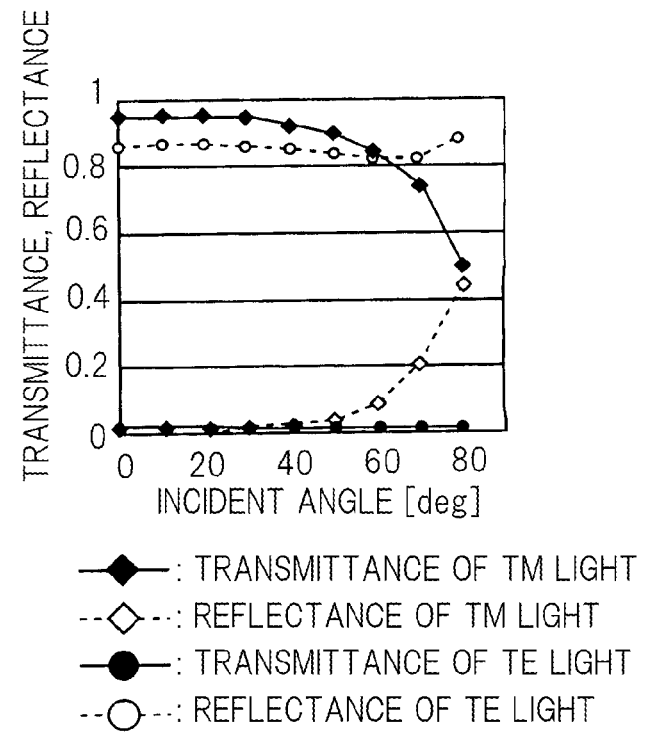
FIG. 19B A graph showing the relationship between the inclination of the incident light in the longitudinal direction of the thin metal wire and reflectance, and the relationship between the inclination of the incident light in the longitudinal direction of the thin metal wire and transmittance, in the polarizer according to the fourth embodiment.
Figure 20A:
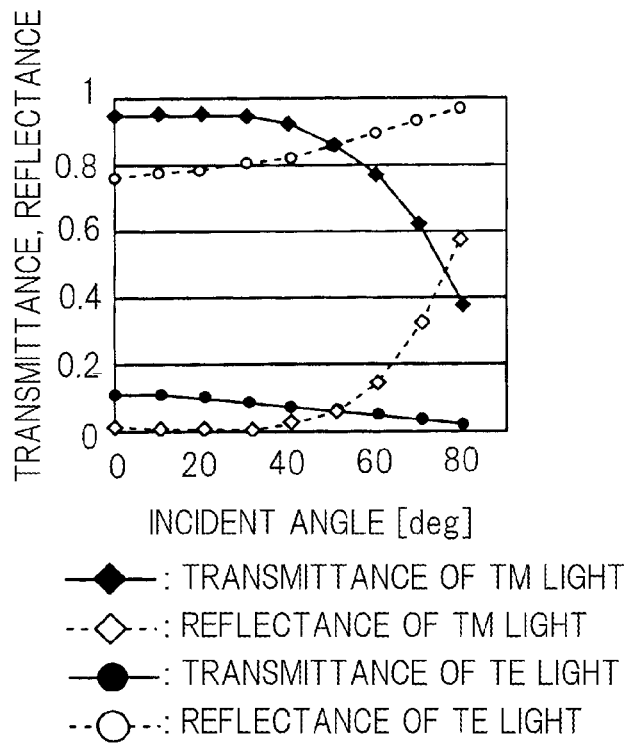
FIG. 20A A graph showing the relationship between the inclination of incident light in a direction orthogonal to the longitudinal direction of a thin metal wire and reflectance, and the relationship between the inclination of incident light in a direction orthogonal to the longitudinal direction of a thin metal wire and transmittance, in a polarizer having a thin metal wire made of only a copper layer.
Figure 20B:
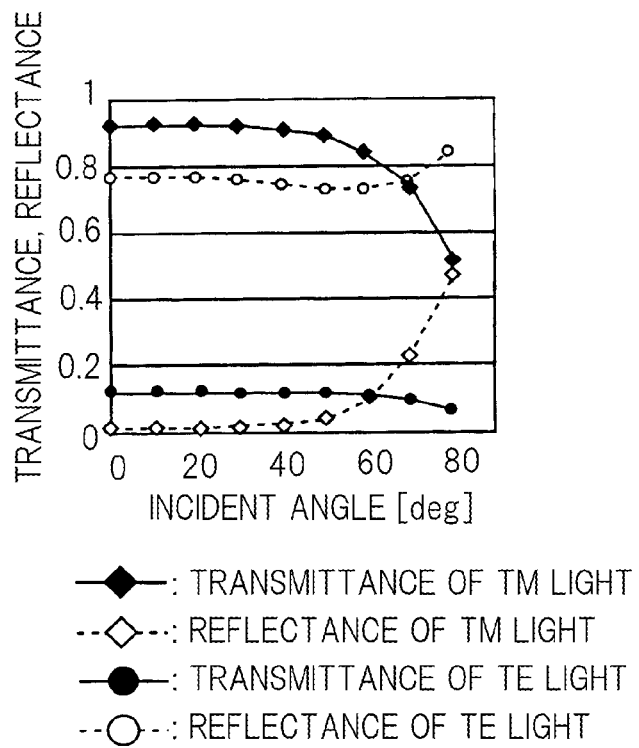
FIG. 20B A graph showing the relationship between the inclination of the incident light in the longitudinal direction of the thin metal wire and reflectance, and the relationship between the inclination of the incident light in the longitudinal direction of the thin metal wire and transmittance, in the polarizer having the thin metal wire made of only the copper layer.
Figure 21A:
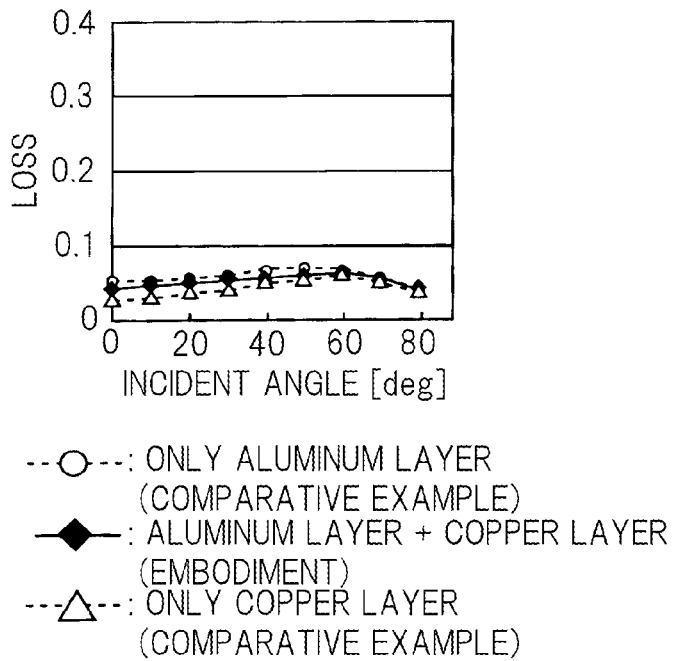
FIG. 21A A graph showing the relationship between the inclination of the incident light in the direction orthogonal to the longitudinal direction of the thin metal wire and the loss of transmitted light (TM light).
Figure 21B:
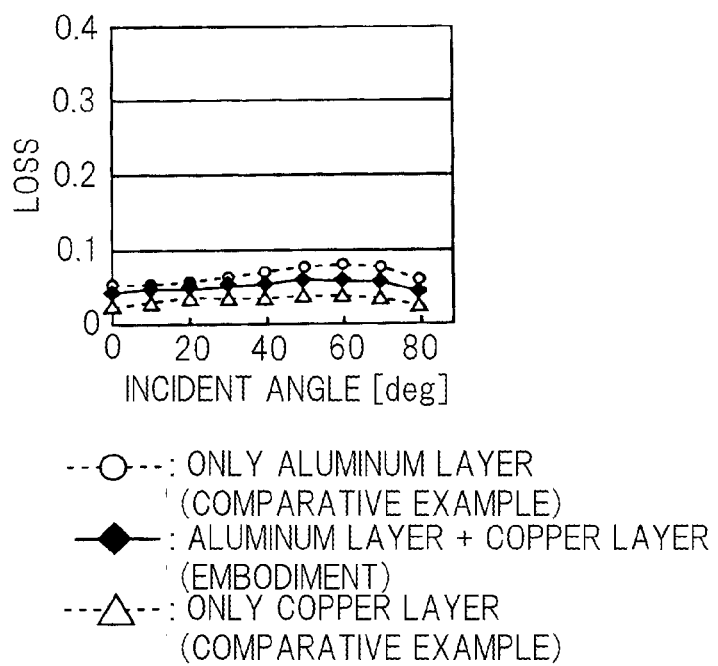
FIG. 21B A graph showing the relationship between the inclination of the incident light in the longitudinal direction of the thin metal wire and the loss of the transmitted light (TM light).
Figure 21C:
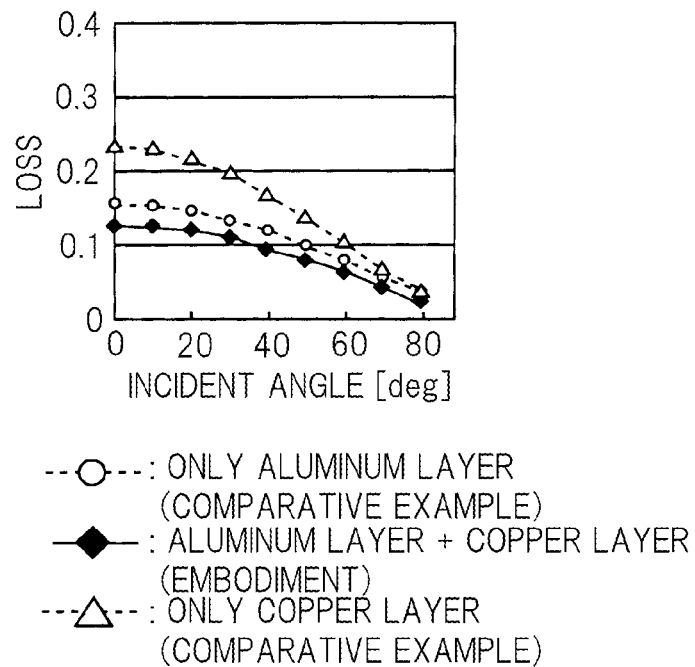
FIG. 21C A graph showing the relationship between the inclination of the incident light in the direction orthogonal to the longitudinal direction of the thin metal wire and the loss of reflected light (TE light).
Figure 21D:
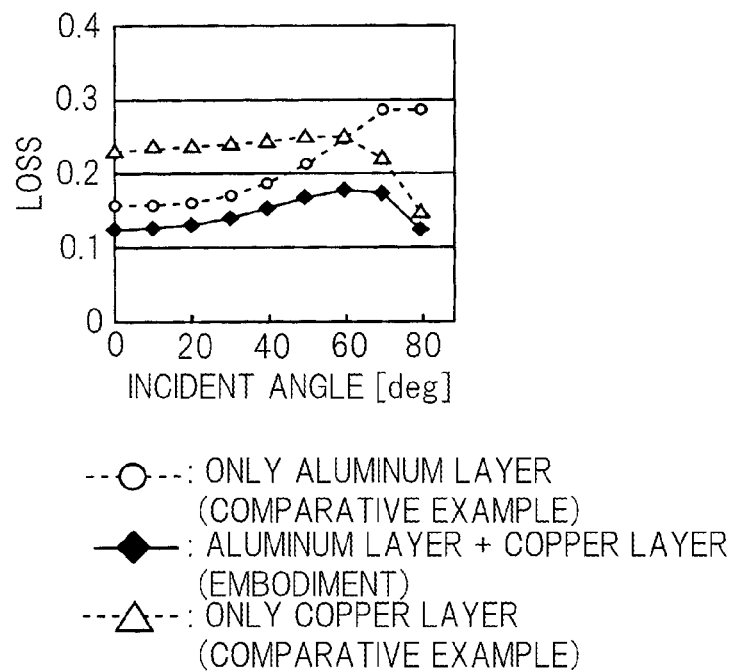
FIG. 21D A graph showing the relationship between the inclination of the incident light in the longitudinal direction of the thin metal wire and the loss of the reflected light (TE light).

FIGS. 19A and 19B respectively show the results of calculating reflectances and transmittances of TE light and TM light when light having a wavelength of 650 nm is entered from a side where thin metal wires 43 have been arranged, namely, copper layer 45 side of thin metal wires 43, in the structure of this embodiment. For comparison with this embodiment, FIGS. 20A and 20B show characteristics of a polarizer according to a first comparative example where each of the wires in a plurality of thin metal wires is equal in pitch and width to that of the embodiment but includes only a copper layer having a thickness of 120 nm. FIGS. 15Aa and 15B show a polarizer according to a second comparative example where each of the wires in a plurality of thin metal wires is equal in pitch and width to that of the embodiment but similarly includes only an aluminum layer. When the embodiment shown in FIGS. 19A and 19B is compared with the comparative examples shown in FIGS. 2A and 20B and FIGS. 15A and 15B, polarizer 4 of the embodiment is higher in reflectance of the TE light than the comparative examples while approximately equal in transmittance of the TM light to the two comparative examples. FIGS. 21A to 21D illustrate the results of comparing the loss in the embodiment with the loss in the two comparative examples. As in the aforementioned case, in the structure of this embodiment, the loss of reflected light, namely, the TE light, is smaller than the loss in the two comparative examples while the loss of transmitted light, namely, the TM light, is approximately equal to the loss in the two comparative examples.

Fifth Embodiment

Figure 22:
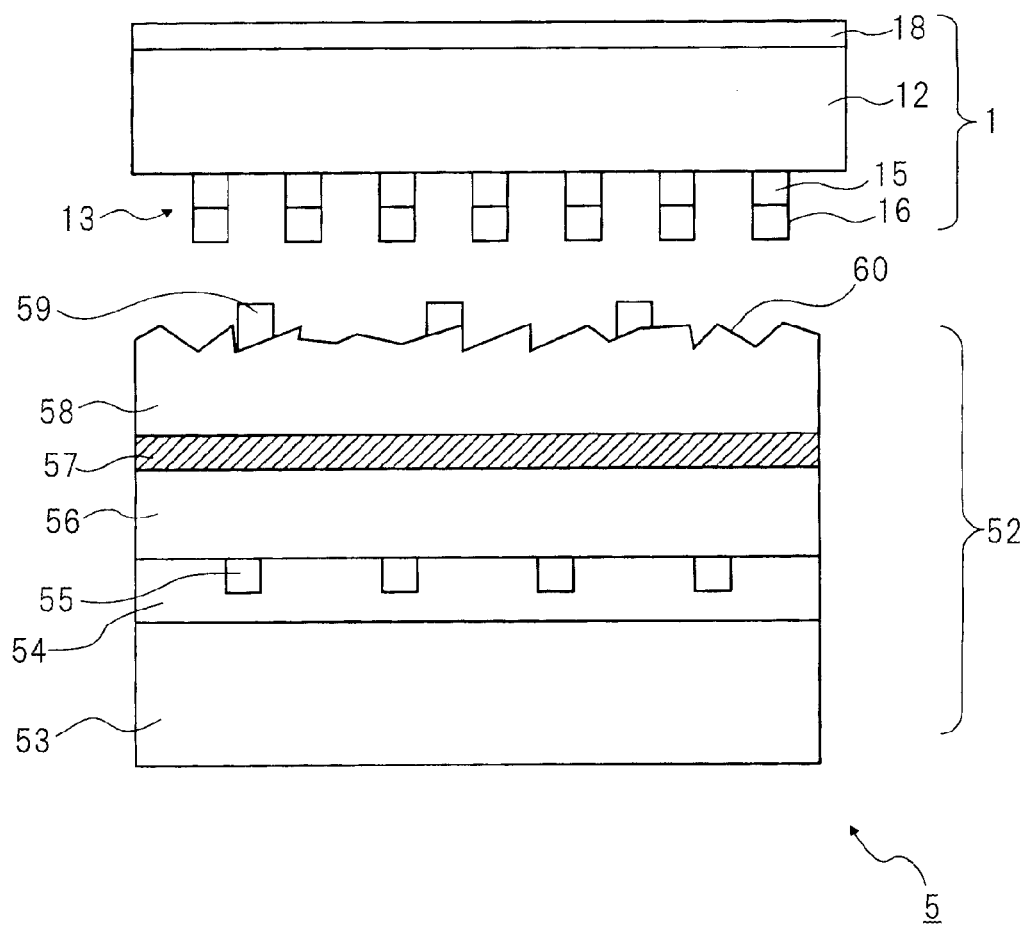
FIG. 22 A sectional view schematically showing the structure of a light-emitting device according to a fifth embodiment.

FIG. 22 is a sectional view schematically showing a light-emitting device according to a fifth embodiment. The light-emitting device of this embodiment is directed to a polarized LED configured by combining a LED with the polarizer of the aforementioned embodiment.

The LED of this embodiment is a light-emitting element using InGaN for an active layer and having a center wavelength (peak emission wavelength) of emission set to 530 nm. As a polarizer in this embodiment, polarizer 1 according to the first embodiment is used.

As shown in FIG. 22, LED 52 included in polarized LED 5 of this embodiment includes, on substrate 53, reflection film 54m, anode electrode 55, p-type semiconductor layer 56, active layer 57, n-type semiconductor layer 58, and cathode electrode 59. Each of electrodes 55 and 59 does not cover the total surface but only covers a part of LED 52. On the emitting surface of LED 52, to increase light extraction efficiency, minute and irregular concave and convex portions of a sub-micron order, namely, texture structure 60, are formed on the surface.

On LED 52 thus configured, polarizer 1 according to the first embodiment is disposed with silver layer 16 side of thin metal wire 13 set to face the emitting surface of LED 52. Among lights emitted from LED 52, TM light is transmitted while TE light is reflected by polarizer 1. The TE light reflected by polarizer 1 returns to LED 52 side to be reflected again by reflective film 54 on the surface or the rear surface of LED 52 or multiply-reflected inside LED 52, and then enters polarizer 1 again. The light reflected by polarizer 1 is uniform in polarizing direction. However, since diffuse reflection occurs in texture structure 60 of the emitting surface of LED 52, the polarized light is nearly eliminated during reflection on LED 52. Thus, nearly one half of the light reflected by LED 52 to enter polarizer 1 again passes through polarizer 1, while the remainder is reflected again by the LED side. Accordingly, in polarized LED 5 of this embodiment, multiple reflection occurs between polarizer 1 and LED 52. This means that the re-use rate of the reflected light from polarizer 1 greatly depends on the reflectance of polarizer 1. Thus, the use of polarizer 1 according to this embodiment enables a significant increase in light use efficiency by increasing the reflectance of polarizer 1.

As described above in the embodiments, by using the aluminum layer and the silver layer or the aluminum layer and the gold layer or the copper layer, loss in the wire grid polarizer can be reduced. However, for the following reason, when the structure of the embodiment is applied, it is desirable to user the structure at a certain wavelength or higher. When light is entered to the wire grid structure of the embodiment or the like, noticeable absorption occurs at a certain wavelength, thus greatly reducing reflectance and reflectance. This wavelength varies from one metallic material to another in the thin metal wire. However, in the case of the aluminum layer, the wavelength is on a side sufficiently shorter than the visible light region, and thus there is almost no influence as long as the polarizer is used in the visible light region. On the other hand, in the case of the silver layer, the gold layer, or the copper layer, the wavelength is located near the visible light region, or can enter the visible light region.

Figure 23A:
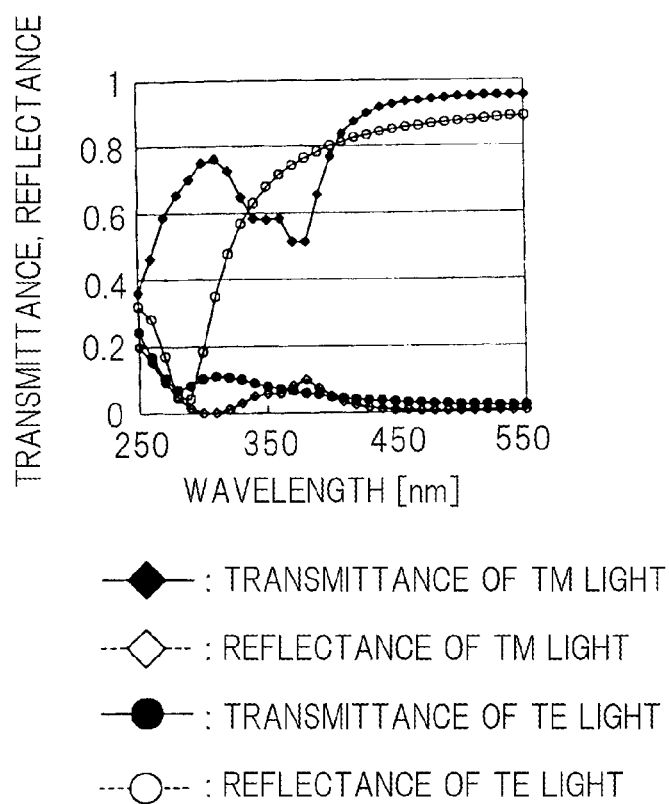
FIG. 23A A graph showing the wavelength dependency of transmittance and reflectance in the polarizer according to the first embodiment.
Figure 23B:
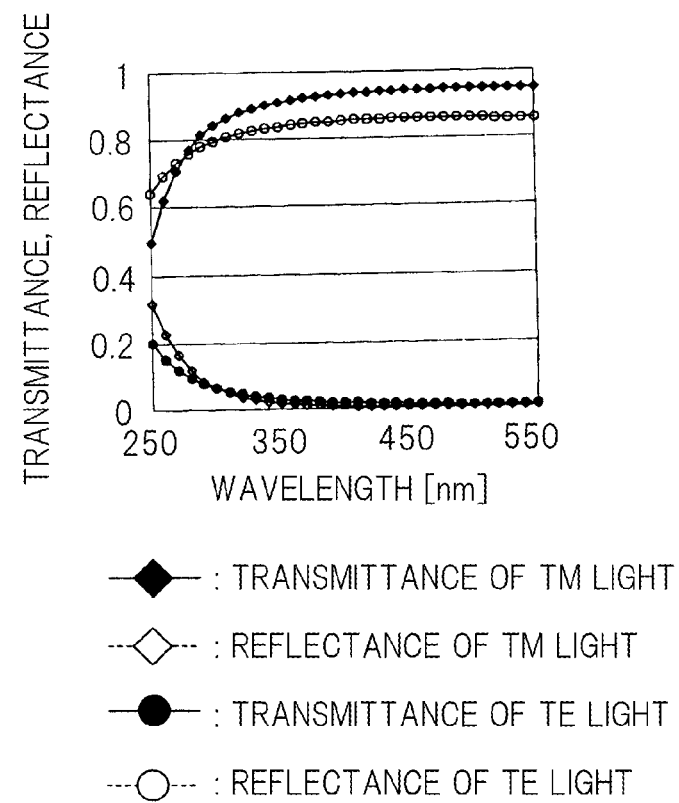
FIG. 23B A graph showing the wavelength dependency of transmittance and reflectance in a polarizer having a thin metal wire made of only an aluminum layer.

FIG. 23 shows the wavelength dependency of transmittance and reflectance in polarizer 1 according to the first embodiment, which includes thin metal wire 13 having aluminum layer 15 and silver layer 16. For comparison with this embodiment, FIG. 23B shows the wavelength dependency of transmittance and reflectance in a polarizer having only an aluminum layer. This calculation is for the case of vertical incidence. In polarizer 1 according to the first embodiment, the transmittance of the TM light is greatly reduced within the range of wavelengths that are about 370 nm to 380 nm. This phenomenon limits wavelengths where the structure of the embodiment is advantageous over a polarizer that includes the thin metal wire made of only an aluminum layer. Such a wavelength where transmittance is minimum depends on the refractive index of a substance that in contact with the silver layer. The higher that this refractive index is, higher, a wavelength is longer. A wavelength is short when the solver layer is in contact with vacuum (substantially similar in the case of air). In such a case, it is when a wavelength is 480 nm or more that the transmittance of the structure of the embodiment is equal to that of the structure made of only the aluminum layer.

The minimum value of the reflectance of the TE light depends on a short wavelength region that is shorter than the minimum value of the transmittance of the TM light. However, as compared with the transmittance, the reflectance tends to increase slowly even when the wavelength is longer. This tendency also affects characteristics in the visible region. In polarizer 1, according to the first embodiment, it is when a wavelength is 470 nm or more that the reflectance of the TE light is equal to that of the polarizer that includes the thin metal wire made of only the aluminum layer.

Thus, it is when a wavelength is 480 nm or more that the polarizer that includes the thin metal wire formed by stacking the aluminum layer and the silver layer is advantageous over the polarizer that includes the thin metal wire made of only the aluminum layer.

Similarly, the structures that includes the thin metal wires using the gold layer and the copper layer according to the third and fourth embodiments are advantageous over the structure that includes the thin metal wire made of only the aluminum layer respectively at wavelengths of 600 nm or more and 630 nm or more. Accordingly, when the polarizers according to the third and fourth embodiments are used in combination with LEDs, as in the case of the fifth embodiment, it is desirable for the center wavelengths of light emitted from the LEDs to be equal to or more than the aforementioned wavelengths.

The embodiments have been described. However, the present invention is not limited to the embodiments. Various changes can be made without departing from the gist of the invention.

For example, in the embodiments, as the materials for the metal layers of the thin metal wires included in the polarizers, aluminum, silver, gold, and copper are used. However, an alloy containing these as main components can be used.

Further, a thin metal wire formed by stacking three or more types of such metal layers can be used. For example, a thin metal wire formed by stacking a silver layer on an aluminum layer and another metal layer on the silver layer can be used.

Other metal layers can be added within a range not affecting the characteristics of the polarizer. For example, in the first embodiment, a chromium metal layer can be inserted with a thickness of 1 nm between aluminum layer 15 and silver layer 16 constituting thin metal layer 13.

Further, other metal layers can be stacked on a side face parallel to the side face of the thin metal wire, namely, the stacking direction. For example, in the first embodiment, an extremely thin gold cover layer can be formed with a thickness of about 0.5 nm on the end surface of aluminum layer 15 and the end surface and the other surface of silver layer 16 on a surface parallel to the stacking direction of thin metal wire 13.

The fifth embodiment has been directed to polarized LED 52 configured by combining polarizer 1 with LED 52. However, other optical components such as a wave plate can be added to the configuration. For example, in the fifth embodiment, the wave plate can be disposed between polarizer 1 and LED 52.

The embodiments of the present invention have been described. However, the present invention is not limited to the embodiments. Various changes understandable to those skilled in the art can be made to the configuration and the specifics of the present invention without departing from the scope of the invention.

This application claims priority from Japanese Patent Application No. 2010-173475 filed Aug. 2, 2010, which is hereby incorporated by reference herein in its entirety.

REFERENCE NUMERALS

1 Polarizer
11 Wire grid structure
12 Glass substrate
13 Thin metal wire
15 Aluminum layer
16 Silver layer

The invention claimed is:

1. A polarizer comprising:
a wire grid structure having a plurality of thin metal wires arranged to extend in one direction,
wherein the thin metal wire is formed by stacking a first metal layer including aluminum and a second metal layer including one element from among gold, silver, and copper, and the second metal layer is disposed on a side wherein incoming light enters the wire grid structure.

2. The polarizer according to claim 1, wherein a refractive index of a substance in contact with a surface of the first metal layer opposite a surface in contact with the second metal layer is higher than that of a substance in contact with a surface of the second metal layer opposite a surface in contact with the first metal layer.

3. The polarizer according to claim 2, further comprising a substrate, wherein the first metal layer and the second metal layer are stacked in this order on one plane of the substrate.

4. A light-emitting device comprising:
the polarizer according to claim 2; and
a light-emitting diode having the polarizer disposed on an emitting surface,
wherein at least a part of light reflected by the polarizer enters the light-emitting diode.

5. The light-emitting device according to claim 4, wherein the second metal layer of the polarizer includes silver, and a center wavelength of light emitted from the light-emitting diode is 480 nm or more.

6. The light-emitting device according to claim 4, wherein the second metal layer of the polarizer includes gold, and a center wavelength of light emitted from the light-emitting diode is 600 nm or more.

7. The light-emitting device according to claim 4, wherein the second metal layer of the polarizer includes gold, and a center wavelength of light emitted from the light-emitting diode is 630 nm or more.

8. The polarizer according to claim 1, further comprising a substrate, wherein the first metal layer and the second metal layer are stacked in this order on one plane of the substrate.

9. A light-emitting device comprising:
the polarizer according to claim 1; and
a light-emitting diode having the polarizer disposed on an emitting surface,
wherein at least a part of light reflected by the polarizer enters the light-emitting diode.

10. The light-emitting device according to claim 9, wherein the second metal layer of the polarizer includes silver, and a center wavelength of light emitted from the light-emitting diode is 480 nm or more.

11. The light-emitting device according to claim 9, wherein the second metal layer of the polarizer includes gold, and a center wavelength of light emitted from the light-emitting diode is 600 nm or more.

12. The light-emitting device according to claim 9, wherein the second metal layer of the polarizer includes gold, and a center wavelength of light emitted from the light-emitting diode is 630 nm or more.

* * * * *